US009236964B2

(12) United States Patent
Oh et al.

(10) Patent No.: US 9,236,964 B2
(45) Date of Patent: Jan. 12, 2016

(54) PROVIDING AN EMERGENCY ALERT SERVICE VIA A MOBILE BROADCASTING

(71) Applicant: LG Electronics Inc., Seoul (KR)

(72) Inventors: Sejin Oh, Seoul (KR); Jeongwoo Kim, Seoul (KR); Minsung Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 13/875,838

(22) Filed: May 2, 2013

(65) Prior Publication Data

US 2013/0242847 A1 Sep. 19, 2013

Related U.S. Application Data

(63) Continuation of application No. 13/882,940, filed as application No. PCT/KR2013/000755 on Jan. 30, 2013.

(60) Provisional application No. 61/605,769, filed on Mar. 2, 2012, provisional application No. 61/617,654, filed on Mar. 29, 2012, provisional application No. 61/643,354, filed on May 7, 2012.

(51) Int. Cl.
H04H 20/59 (2008.01)
H04W 4/22 (2009.01)
H04H 20/71 (2008.01)

(52) U.S. Cl.
CPC ............... H04H 20/59 (2013.01); H04H 20/71 (2013.01); H04W 4/22 (2013.01)

(58) Field of Classification Search
None
See application file for complete search history.

(56) References Cited

U.S. PATENT DOCUMENTS

2006/0262227 A1* 11/2006 Jeong ............................ 348/723
2011/0081882 A1 4/2011 Daly et al.

FOREIGN PATENT DOCUMENTS

| CN | 101868972 A | 10/2010 |
| KR | 10-2009-0011138 | 2/2009 |
| KR | 10-2009-0031267 | 3/2009 |
| KR | 10-2010-0126192 | 12/2010 |
| KR | 10-2011-0105951 | 9/2011 |

* cited by examiner

Primary Examiner — Ian N Moore
Assistant Examiner — Latresa McCallum
(74) Attorney, Agent, or Firm — Dentons US LLP

(57) ABSTRACT

A device providing an emergency alert service via a mobile broadcasting, includes a data group formatter to generate a data group containing a part of a signaling data and a RS frame portion, and a broadcasting signal generating unit to generate a mobile broadcasting signal containing the data group. The FIC, included in the data group, is transmitted in a form of a plurality of FIC segments. The FIC segment header includes a wake-up identifier field indicating whether a mobile broadcasting receiver performs a wake-up function to automatically turn on a power and to provide the emergency alert message.

12 Claims, 31 Drawing Sheets

FIG. 5

| Syntax | No. Bits | Format |
|---|---|---|
| EAT_MH_section() () { | | |
|     table_id | 8 | 0xEA |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_MH_protocol_version | 8 | 0X0 |
|         ensemble_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_info | | |
|     ( | | |
|         automatic_tuning_channel_number | 8 | uimsbf |
|         automatic_tuning_ts_id | 16 | uimsbf |
|         automatic_tuning_ensemble_id | 8 | uimsbf |
|         automatic_tuning_service_id | 16 | uimsbf |
|     ) | | |
|     num_EAS_messages | 8 | uimsbf |
|     for (m=0; m< num_EAS_messages; m++) { | | |
|     EAS_message_id | 32 | uimsbf |
|     reserved | 7 | '1111111' |
|     type_of_responder | 2 | uimsbf |
|     EAS_IP_version_flag | 1 | bslbf |
|     EAS_message_transfer_type | 3 | uimsbf |
|     EAS_message_encoding_type | 3 | uimsbf |
|     if(type_of_responder == 0x01 \| 0x03){ | | |
|         reserved | 10 | |
|         type_of_disciplines | 6 | uimsbf |
|     } | | |
|     if(EAS_message_transfer_type == 0x02) { | | |
|         reserved | 4 | '1111' |
|         EAS_message_length /* N */ | 12 | uimsbf |
|         EAS_message_bytes() | 8*N | var |
|     } | | |
|     else if(EAS_message_transfer_type == 0x03) { | | |
|         IP_address | 32 or 128 | uimsbf |
|         UDP_port_num | 16 | uimsbf |
|     } | | |
|         EAS_NRT_service_id | 16 | uimsbf |
|     } | | |
| } | | |

FIG. 6

| Value | Designation |
|---|---|
| 0x00 | Not Specified |
| 0x01 | Non-public users only |
| 0x02 | Public users only |
| 0x03 | For both public and non-public users |

The type of responder

| Value | Designation |
|---|---|
| 0x20 | EAS |
| 0x10 | EXPLOSIVES |
| 0x08 | FIRE |
| 0x04 | HAZMAT |
| 0x02 | LAW ENFORCEMENT |
| 0x01 | SEARCH & RESCUE |

The meaning of each bit in the type_of_discipline field

| Value | Designation |
|---|---|
| 0x00 | Not Specified |
| 0x01 | There is no alert message. Only NRT files are being sent without any alert message. |
| 0x02 | Alert message bytes shall be included in the EAT-MH. Alert message shall be transferred through the following EAS_message_bytes() field in the message loop of the EAT-MH. |
| 0x03 | Alert message shall be transferred through IP datagram. |
| 0x04-0x07 | Reserved for future use |

EAS_message_transfer_type value

| Value | Designation |
|---|---|
| 0x00 | Not Specified |
| 0x01 | No Encoding |
| 0x02 | gzip |
| 0x03-0x07 | Reserved for future use |

EAS_message_encoding_type value

FIG. 7

| Syntax | No. Bits | Format |
|---|---|---|
| emergency_alert_IP_datagram() { | | |
|     IP_header | | |
|     UDP_header | | |
|     { | | |
|     EAS_message_ID | 32 | uimsbf |
|     EAS_message_length | 16 | uimsbf |
|     EAS_message_bytes() | N | var |
|     } | | |
| } | | |

IP Datagram Syntax used to send the EAS message bytes

FIG. 8

| Syntax | No. Bits | Format |
|---|---|---|
| FIC_segment_header() { | | |
|    FIC_segment_type | 2 | uimsbf |
|    reserved | 1 | '1' |
|    wake_up_indicator | 1 | bslbf |
|    FIC_chunk_major_protocol_version | 2 | uimsbf |
|    current_next_indicator | 1 | bslbf |
|    error_indicator | 1 | bslbf |
|    FIC_segment_num | 4 | uimsbf |
|    FIC_last_segment_num | 4 | uimsbf |
| } | | |

| Value | Designation |
|---|---|
| 0x00 | Wake-up |
| 0x01 | Reserved(Normal A/V) | wake_up_indicator value

FIG. 9

| Syntax | No. Bits | Format |
|---|---|---|
| FIC_chunk_payload() { | | |
|   for (i=0; i<num_ensembles; i++){ | | |
|     ensemble_id | 8 | uimsbf |
|     reserved | 3 | '111' |
|     ensemble_protocol_version | 5 | uimsbf |
|     SLT_ensemble_indicator | 1 | bslbf |
|     GAT_ensemble_indicator | 1 | bslbf |
|     EAT_ensemble_indicator | 1 | bslbf |
|     MH_service_signaling_channel_version | 5 | uimsbf |
|     num_MH_services | 8 | uimsbf |
|     for(j=0;j<num_MH_services;j++){ | | |
|       MH_service_id | 16 | uimsbf |
|       reserved | 3 | '111' |
|       multi_ensemble_service | 2 | uimsbf |
|       MH_service_status | 2 | uimsbf |
|       SP_indicator | 1 | bslbf |
|     } | | |
|   } | | |
| } | | |

FIG. 11

| Syntax | No. Bits | Format |
|---|---|---|
| FIC_chunk_header() { | | |
|     FIC_chunk_major_protocol_version | 2 | |
|     FIC_chunk_minor_protocol_version | 3 | '010' |
|     FIC_chunk_header_extension_length | 3 | '010' |
|     ensemble_loop_header_extension_length | 3 | '001' |
|     MH_service_loop_extension_length | 3 | '000' |
|     reserved | 1 | '1' |
|     current_next_indicator | 1 | bslbf |
|     transport_stream_id | 16 | uimsbf |
|     EAS_wake_up_extended_info | | |
|     ( | | |
|         EAS_wake_up_extended_info_Tag | 8 | 0xTBD |
|         EAS_wake_up_version_number | 8 | uimsbf |
|     ) | | |
|     num_ensembles | 8 | uimsbf |
| } | | |

FIG. 14

```
<?xml version="1.0" encoding="UTF-8"?>
 <xs:schema xmlns:xs="http://www.w3.org/2001/XMLSchema"
     xmlns:fl="http://www.example.com/FLUTE"
     elementFormDefault:xs="qualified"
     targetNamespace:xs="http://www.example.com/FLUTE">
  <xs:element name="FDT-Instance">
  <xs:complexType>
   <xs:sequence>
    <xs:element name="File" maxOccurs="unbounded" minOccurs="0" >
```

FIG. 15

| Syntax | No. Bits | Format |
|---|---|---|
| TPC_data() { | | |
|     sub_frame_number | 3 | uimsbf |
|     slot_number | 4 | uimsbf |
|     parade_id | 7 | uimsbf |
|     ... | | |
|     fic_version | 5 | uimsbf |
|     ... | | |
|     reserved | 2 | '11' |
|     wake_up_indicator | 1 | bslbf |
|     wake_up_version_number | 5 | uimsbf |
|     reserved | 8 | '11111111' |
|     tpc_protocol_version | 1 | bslbf |
| } | | |

FIG. 16

| Syntax | No. Bits | Format |
|---|---|---|
| FIC_segment_header() { | | |
|    FIC_segment_type | 2 | uimsbf |
|    wake_up_indicator | 2 | uimsbf |
|    FIC_chunk_major_protocol_version | 2 | uimsbf |
|    current_next_indicator | 1 | bslbf |
|    error_indicator | 1 | bslbf |
|    FIC_segment_num | 4 | uimsbf |
|    FIC_last_segment_num | 4 | uimsbf |
| } | | |

| Value | Designation |
|---|---|
| 0x00 | Not specified |
| 0x01 | Wake-up1 |
| 0x02 | Wake-up2 |
| 0x03 | Reserved(Normal A/V) | wake_up_indicator value

FIG. 17

```
Content
id
version
validFrom
validTo
globalContentID
baseCID
ServiceReference
idRef
weight
Name
Description
...
PrivateExt
ContentPrivateExt
ContentLinkage
EAS_Content_message_ID
EAS_Content_message_TAG
EssentialCapabilities
Codes
Strings
NonessentialCapabilities
Codes
Strings
RequiredStorage
UpdatesAvailable
InternetLocations
all
PlaybackDelay
```

FIG. 22

| Syntax | No. Bits | Format |
|---|---|---|
| EAT_MH_section() { | | |
|     table_id | 8 | 0xEA |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_EAS_messages | 8 | uimsbf |
|     for(i=0; i< num_EAS_messages; i++) { | | |
|         EAS_message_id | 32 | uimsbf |
|         event_code | 24 | uimsbf |
|         reserved | 4 | '1111' |
|         event_urgency | 3 | uimsbf |
|         event_severity | 3 | uimsbf |
|         event_certainty | 3 | uimsbf |
|         EAS_message_type | 3 | uimsbf |
|         if((EAS_message_type == 0x02) \|\| (EAS_message_type == 0x03)) { | | |
|             num_referenced_messages | 8 | uimsbf |
|             for(j=0; j< num_referenced_messages; j++) { | | |
|                 referenced_message_id | 32 | uimsbf |
|             } | | |
|         } | | |
|         event_expiry_time | 16 | uimsbf |
|         reserved | 4 | '1111' |
|         num_geo_code | 12 | uimsbf |
|         for(k=0; k<num_geo_code; k++) { | | |
|             geo_code | 24 | |
|         } | | |
|         alert_text_length /* N */ | 12 | uimsbf |
|         alert_text() | 8*N | |
|     } | | |
| } | | |

FIG. 23

| Value | Designation |
|---|---|
| 0x00 | Unknown |
| 0x01 | Past |
| 0x02 | Future |
| 0x03 | Expected |
| 0x04 | Immediate |
| 0x05-0x07 | Reserved for future use | event urgency field value

| Value | Designation |
|---|---|
| 0x00 | Unknown |
| 0x01 | Minor |
| 0x02 | Moderate |
| 0x03 | Severe |
| 0x04 | Extreme |
| 0x05-0x07 | Reserved for future use | event severity field value

| Value | Designation |
|---|---|
| 0x00 | Unknown |
| 0x01 | Unlikely |
| 0x02 | Possible |
| 0x03 | Likely |
| 0x04 | Observed |
| 0x05-0x07 | Reserved for future use | event certainty field value

| Value | Designation |
|---|---|
| 0x00 | Not Specified |
| 0x01 | Alert |
| 0x02 | Update |
| 0x03 | Cancel |
| 0x04 | Ack |
| 0x05 | Error |
| 0x06-0x07 | Reserved for future use |

EAS_message_type field value

FIG. 24

| Syntax | No. Bits | Format |
|---|---|---|
| EAT_MH_section() () { | | |
|     table_id | 8 | 0xEA |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_MH_protocol_version | 8 | 0x0 |
|         ensemble_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_EAS_messages | 8 | uimsbf |
|     for(i=0; i<num_EAS_messages; i++) { | | |
|         EAS_message_id | 32 | uimsbf |
|         reserved | 4 | '1111' |
|         num_FIPS_codes /*M*/ | 12 | uimsbf |
|         FIPS_codes | 24*M | uimsbf |
|         EAS_event_code | 24 | uimsbf |
|         content_coding | 2 | uimsbf |
|         content_type | 2 | uimsbf |
|         EAS_message_length /* N */ | 12 | uimsbf |
|         EAS_message_bytes() | 8*N | |
|         NRT_service_id | 16 | uimsbf |
|     } | | |
| } | | |

FIG. 25

| Syntax | No. Bits | Format |
|---|---|---|
| EAT_MH_section() () { | | |
|    table_id | 8 | 0xEA |
|    section_syntax_indicator | 1 | '0' |
|    private_indicator | 1 | '1' |
|    reserved | 2 | '11' |
|    section_length | 12 | uimsbf |
|    table_id_extension { | | |
|      EAT_MH_protocol_version | 8 | uimsbf |
|      ensemble_id | 8 | uimsbf |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    num_EAS_messages | 8 | uimsbf |
|    for (i=0; i< num_EAS_messages; i++) { | | |
|      EAS_message_id | 32 | uimsbf |
|      reserved | 24 | uimsbf |
|      EAS_message_length /* N */ | 4 | '1111' |
|      EAS_message_bytes() | 3 | uimsbf |
|      NRT_service_id | 3 | uimsbf |
|      reserved | 3 | uimsbf |
|      NRT_service_IP_address_flag | 3 | uimsbf |
|      If(NRT_service_IP_address_flag) { | | |
|         SG_bootstrap_data() | 8 | uimsbf |
|      } | | |
|    } | 32 | uimsbf |
| } | | |

FIG. 26

| Syntax | No. Bits | Format |
|---|---|---|
| EAS_service_descriptor() { | | |
|     descriptor_tag | 8 | TBD |
|     descriptor_length | 8 | uimsbf |
|     priority_level | 4 | uimsbf |
|     EAS_message_sent_type | 4 | uimsbf |
|     if(EAS_message_sent_type == 0x02) { | | |
|         IP_address | 32 or 128 | uimsbf |
|         UDP_port_num | 16 | uimsbf |
|     } | | |
|     service_related_nrt_service_id | 16 | uimsbf |
| } | | |

| Value | Designation |
|---|---|
| 0x00 | Not Specified |
| 0x01 | High |
| 0x02 | Normal |
| 0x03-0x0E | Reserved for future use | priority_level field value

| Value | Designation |
|---|---|
| 0x00 | Not Specified |
| 0x01 | EAT |
| 0x02 | IP Datagram |
| 0x03-0x0E | Reserved for future use |

EAS_message_sent_type field value

FIG. 27

| Syntax | No. Bits | Format |
|---|---|---|
| EAS_service_descriptor() { | | |
|     descriptor_tag | 8 | TBD |
|     descriptor_length | 8 | uimsbf |
|     priority_level | 4 | uimsbf |
|     EAS_message_sent_type | 4 | uimsbf |
|     if(EAS_message_sent_type == 0x02) { | | |
|         IP_version_flag | 1 | bslbf |
|         reserved | 7 | '1111111' |
|         IP_address | 32 or 128 | uimsbf |
|         UDP_port_num | 16 | uimsbf |
|     } | | |
|     ensemble_related_nrt_service_id | 16 | uimsbf |
| } | | |

FIG. 28

| Component_type | Meaning |
|---|---|
| 0-34 | Reserved by IANA |
| 35 | H.264/AVC video |
| 36 | SVC |
| 37 | HE AAC v2 |
| 38 | FLUTE |
| 39 | STKM |
| 40 | LTKM |
| 41 | OMA-RME DIMS |
| 42 | NTP |
| 43 | EAS |
| 44-71 | Reserved by ATSC |

| Syntax | No. Bits | Format |
|---|---|---|
| MH_component_data () {  <br>    TSI  <br>} | 16 | uimsbf |

FIG. 29

| Syntax | No. Bits | Format |
|---|---|---|
| emergency_alert_IP_datagram() {<br>  IP_header<br>  UDP_header<br>  reserved<br>  payload_type_indicator<br>  payload<br>} | 4<br>4<br>N | '1111'<br>uimsbf |

| Value | Designation |
|---|---|
| 0x00 | Not Specified |
| 0x01 | Syntax |
| 0x02 | Alert Message as it is |
| 0x03~0x0E | Reserved for future use | payload_type_indicator field value

FIG. 30

| Syntax | No. Bits | Format |
|---|---|---|
| emergency_alert_IP_datagram() { | | |
|     IP_header | | |
|     UDP_header | | |
|     reserved | | |
|     payload_type_indicator | 4 | '1111' |
|     IP_header | 4 | '0010' |
|     while(!EOF){ | | |
|         message_body_length | 15 | uimsbf |
|         message_gzipped_flag | 1 | bsblf |
|         message_body | N | |
|     } | | |
| } | | |

FIG. 31

```
Content
  id
  version
  validFrom
  validTo
  globalContentID
  baseCID
  emergency
  ServiceReference
      idRef
      weight
  Name
  Description
  StartTime
  EndTime
  AudioLanguage
      languageSDPTag
  TextLanguage
      languageSDPTag
  Length
  ParentalRating
      ratingSystem
      ratingValueName
  Genre
  Extension
      url
      Description
  PreviewDataReference
      idRef
      usage
  PrivateExt
```

PROVIDING AN EMERGENCY ALERT SERVICE VIA A MOBILE BROADCASTING

This application is a Continuation of application Ser. No. 13/882,940 filed on May 1, 2013, and claims priority of 35 USC §371 National Stage entry of international Application No. PCT/KR2013/000755 filed on Jan. 30, 2013 and U.S. Provisional Application Nos. 61/605,769 filed on Mar. 2, 2012; 61/617,654 filed on Mar. 29, 2012 and 61/643,354 filed on May 7, 2012, all of which are incorporated by reference in their entirety herein.

TECHNICAL FIELD

The present invention relates to a mobile broadcasting system, and more particularly, to a method of providing an emergency alert service via a mobile broadcasting system and apparatus therefor.

BACKGROUND ART

According to a development of a portable device, transmission/reception of broadcasting in a mobile device becomes available. Hence, a broadcasting signal transmission system suitable for a mobile broadcasting environment is being constructed. Moreover, an artificial or natural disaster is globally taking place. Regarding the disaster, it is necessary to promptly provide the corresponding disaster information. In case of a mobile broadcasting, since a location of which a user receives the broadcasting may vary and a disaster highly correlates with the location, it is effective to provide the information on the disaster via the mobile broadcasting. Yet, a technology for providing information on the disaster is not developed yet in a current mobile broadcasting system.

DISCLOSURE OF THE INVENTION

Technical Task

A technical task that the present invention intends to achieve is to solve the aforementioned problem, i.e., to provide an emergency alert service in a mobile broadcasting system.

Technical Solution

To achieve these and other advantages and in accordance with the purpose of the present invention, as embodied and broadly described, according to one embodiment a method of providing an emergency alert service via a mobile broadcasting includes the steps of generating an RS frame, which is a $2^{nd}$ dimensional data frame, in a manner of performing an RS (Reed-Solomon)-CRC (Cyclic Redundancy Check) encoding on an ensemble comprising a mobile data for a mobile broadcasting service and a service signaling channel containing an access information on the mobile broadcasting service, dividing the generated RS frame into a plurality of RS frame portions, generating a signaling data comprising a TPC (Transmission Parameter Channel) for signaling a transmission parameter of the mobile broadcasting and a FIC (Fast Information Channel) containing a connection information between the ensemble and the broadcasting service, generating a data group containing a part of the signaling data and the RS frame portion, and generating a mobile broadcasting signal containing the data group, wherein the service signaling channel includes a service map table containing a property information on a mobile service transmitted by the ensemble and a mobile emergency alert table containing an information for transmitting an emergency alert service to the mobile broadcasting and wherein the mobile emergency alert table includes an emergency alert message transmission type field indicating a scheme of transmitting the emergency alert message.

Preferably, the emergency alert message transmission type field indicates the emergency alert message transmitted in a manner of being included in the mobile emergency alert table or transmitted via an IP datagram.

Preferably, the mobile emergency alert table further includes an automatic tuning channel number field indicating a physical RF channel number to perform an automatic tuning to a physical RF channel providing the emergency alert service.

Preferably, the mobile emergency alert table further includes an emergency alert responder type field indicating a reception responder of the emergency alert message.

Preferably, the mobile emergency alert table further includes an emergency situation type field identifying an emergency situation, which becomes a target of the emergency alert.

Preferably, the mobile emergency alert table further includes an NRT service identifier field identifying an NRT service providing an additional information related to the emergency alert message.

Preferably, the FIC is transmitted in a manner of being included in the data group in a form of a plurality of FIC segments, the FIC segment includes a FIC segment header and a FIC segment payload, and the FIC segment header includes a wake-up identifier field indicating whether a mobile broadcasting receiver capable of performing a wake-up function to automatically turn on the power and to provide the emergency alert message.

Preferably, the FIC includes a FIC header and a FIC payload and the FIC payload includes an EAT_ensemble_indicator field indicating whether the mobile emergency alert table is transmitted via the service signaling channel included in the ensemble, an MH_service_signaling_channel_version field indicating a version information of the service signaling channel included in the ensemble, and a num_MH_services field indicating the number of the mobile service transmitted via the ensemble.

Preferably, the FIC header includes an EAS_wake_up_extended_info_Tag field identifying whether a byte of an extended FIC header contains an information for a wake-up function and an EAS_wake_up_version_number field indicating the version information of the wake-up signaling.

To further achieve these and other advantages and in accordance with the purpose of the present invention, according to one embodiment of the present invention a device providing an emergency alert service via a mobile broadcasting includes an RS frame encoder configured to generate an RS frame, which is a $2^{nd}$ dimensional data frame, in a manner of performing an RS (Reed-Solomon)-CRC (Cyclic Redundancy Check) encoding on an ensemble comprising a mobile data for a mobile broadcasting service and a service signaling channel containing an access information on the mobile broadcasting service, an RS frame divider configured to divide the generated RS frame into a plurality of RS frame portions, a signaling encoder configured to generate a signaling data comprising a TPC (Transmission Parameter Channel) for signaling a transmission parameter of the mobile broadcasting and a FIC (Fast Information Channel) containing a connection information between the ensemble and the broadcasting service, a data group formatter configured to generate a data group containing a part of the signaling data and the RS frame portion, and a broadcasting signal generating unit configured to generate a mobile broadcasting signal containing the data group, wherein the service signaling channel includes a service map table containing a property information on a mobile service transmitted by the ensemble and a mobile emergency alert table containing an information for transmitting an emergency alert service to the mobile broadcasting and wherein the mobile emergency alert table includes an emergency alert message transmission type field indicating a scheme of transmitting the emergency alert message.

Advantageous Effects

According to the present invention, an emergency alert service can be provided by a mobile broadcasting environment as well.

DESCRIPTION OF DRAWINGS

FIG. 5 is a diagram of a syntax of a mobile emergency alert table according to one embodiment of the present invention;

FIG. 6 is a diagram for indicating the meaning of type_of_responder field, type_of_disciplines field, EAS_message_transfer_type field, EAS_message_encoding_type field in accordance with each value according to one embodiment of the present invention;

FIG. 7 is a diagram of IP datagram syntax, in case that an emergency alert message transmitted via the IP datagram is identified, according to one embodiment of the present invention;

FIG. 8 is a diagram of a syntax of a FIC segment header according to one embodiment of the present invention;

FIG. 9 is a diagram of a syntax of a FIC chunk payload according to one embodiment of the present invention;

FIG. 11 is a diagram of a syntax of a FIC chunk header according to one embodiment of the present invention;

FIG. 14 is a diagram of a FLUTE FDT (File Delivery Table) instance according to one embodiment of the present invention;

FIG. 15 is a diagram of a TPC syntax for a wake-up signaling using a TPC according to a different embodiment of the present invention;

FIG. 16 is a diagram of a syntax of a FIC segment header according to a different embodiment of the present invention;

FIG. 17 is a diagram of an ESG content fragment according to a different embodiment of the present invention;

FIG. 22 is a diagram of a syntax of a mobile emergency alert table according to a different embodiment of the present invention;

FIG. 23 is a diagram of a definition for a value available to an event_urgency field, an event_severity field, an event_certainty field, and an EAS_message_type field according to a different embodiment of the present invention;

FIG. 24 is a diagram of a mobile emergency alert table according to a different embodiment of the present invention;

FIG. 25 is a diagram of a mobile emergency alert table according to a different embodiment of the present invention;

FIG. 26 is a diagram of a descriptor to signal an emergency alert service via an extension of SMT according to one embodiment of the present invention;

FIG. 27 is a diagram of a descriptor to signal an emergency alert service according to a different embodiment of the present invention;

FIG. 28 is a diagram of a signaling to provide an emergency alert service with one component according to one embodiment of the present invention;

FIG. 29 is a diagram of emergency_alert_IP_datagram ( ) descriptor to transmit an emergency alert service according to one embodiment of the present invention;

FIG. 30 is a diagram of emergency_alert_IP_datagram ( ) descriptor to transmit an emergency alert service according to a different embodiment of the present invention;

FIG. 31 is a diagram of an ESG content fragment for an emergency alert service according to a different embodiment of the present invention.

BEST MODE

Figure 1:
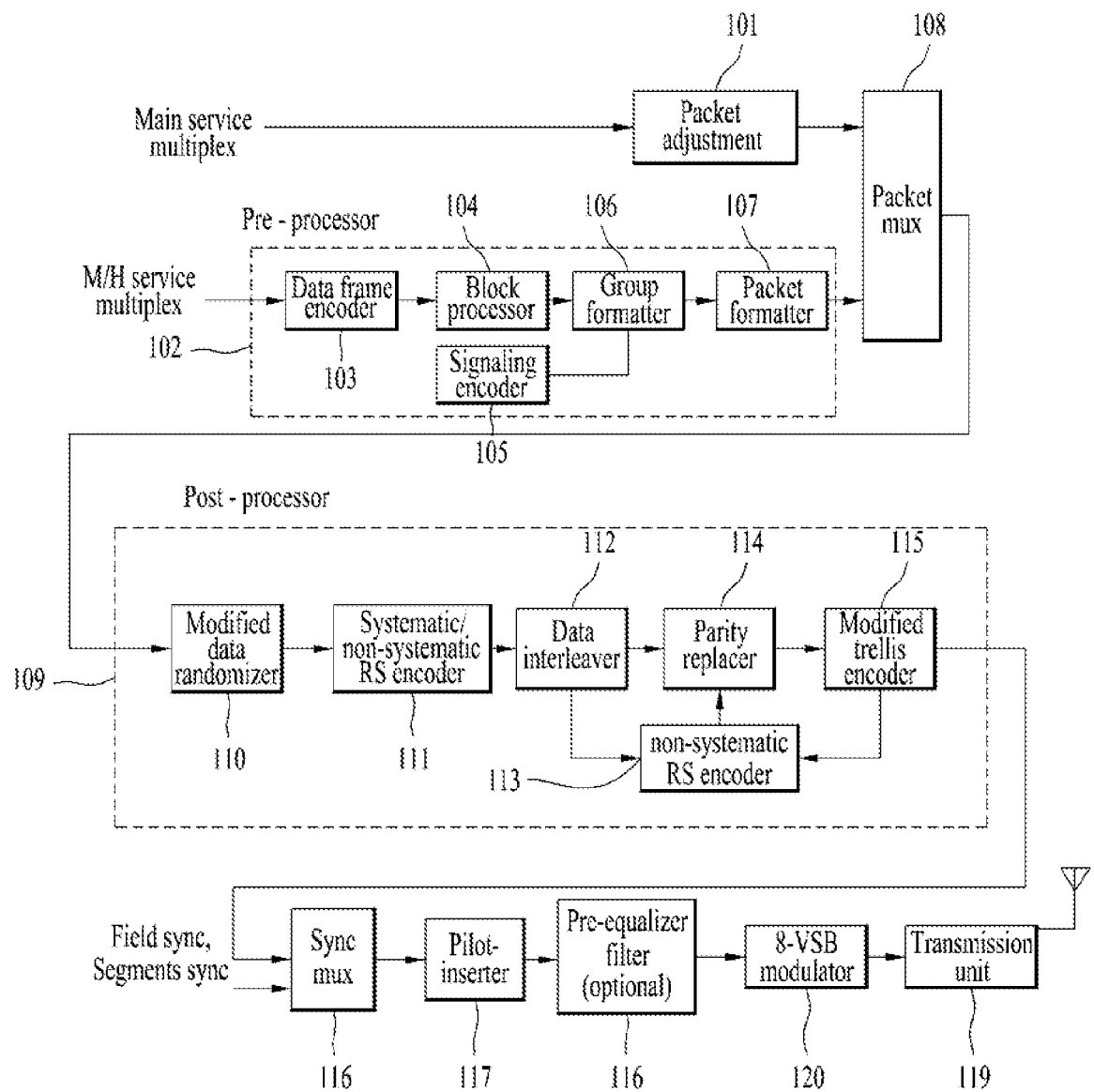
FIG. 1 is a diagram of a transmission system according to one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the following description, a terminology and an abbreviation are defined for the purpose of understanding and clarity of the present invention.

Among the terminologies used for detail explanation on the invention, a main service data corresponds to a data received by a fixed broadcast receiving system and may be able to include an audio/video data. More particularly, the main service data may be able to include a high definition (HD) or a standard definition (SD) audio/video data and may be able to include various kinds of data for broadcasting.

A known data corresponds to a data known in advance according to an appointment between a broadcast receiving system and a broadcast transmitting system.

A terminology 'MH' corresponds to the terminology of a mobile/handheld and corresponds to the opposite terminology of a fixed type system. More specifically, an MH service data (or a mobile service data) may be able to include a certain kind of data used by a mobile or portable system. Hence, the mobile service data according to one embodiment of the present invention may be non-limited to the MH service data.

The mobile service data may be able to include such information as a program execution file or stock information. The mobile service data may be able to include an audio/video data. More specifically, the mobile service data may correspond to the audio/video data having a lower resolution and lower data rate compared to the main service data. For instance, if an MPEG-2 codec is used as an audio/video codec for a main service, the audio/video codec having a higher image compression rate such as the MPEC-2 codec, an MPEC-4 advanced video coding (AVC), or a scalable video coding (SVC) can be used for a mobile service.

The mobile service data may be able to include a TPEG data (transport protocol expert group data) for real time traffic broadcasting. Or, the mobile service data may be able to include such a broadcast service/program as a weather information service, a traffic information service, a stock information service, a viewer participating quiz program, a real time election, a bidirectional education broadcast program, a game service, or a music program.

In the present invention, a data group (or an MH group) means a set of data packet transmitted via a data slot (or an MH slot).

A data group division indicates a set of data group region in a slot. In this case, the data group division can be classified into a primary data group division and a secondary data group division. A set of the primary data group division in an MH frame forms a primary parade and the secondary data group division forms a secondary parade.

A parade (or an MH parade) indicates a set of data group having an identical FEC parameter. Or, the parade may indicate a set of data group division of a data group having an identical data group type.

RS frame (Reed-Solomon Frame) is a 2 dimensional data frame. In this case, a payload of the RS frame is encoded by an RS-CRC (Reed Solomon-Cyclic Redundancy Check) coding.

Ensemble (MH ensemble) indicates a set of the RS frame to which an identical FEC (Forward Error Correction) is applied. In this case, each of the RS frames includes a set of IP stream in a manner of being compressed. The ensemble may be able to include a mobile service data for a mobile service and a mobile service signaling channel for a signaling of the mobile service.

According to one embodiment of the present invention, the mobile service data for the mobile service can be transmitted on a part of a transmission channel configured to transmit a main service data of a main service. Or, the mobile service data for the mobile service can be transmitted on a whole of the transmission channel used for the main service. In this case, the data necessary for the mobile service can be called the mobile service data. Hence, the mobile service data may include a known data, a signaling data, and/or an RS parity data.

The mobile service data can be classified into the mobile service data of a CMM (Core Mobile Mode) and the mobile service data of a SFCMM (Scalable Full Channel Mobile Mode).

The CMM is a broadcast mode configured to transmit the main service data and the mobile service data together. As one example, the CMM may be able to use at least 38 packets out of 156 packets of each slot to transmit the main service data for a conventional broadcasting.

The SFCMM is the broadcast mode configured to transmit the mobile service data only or configured to transmit the main service data less than the CMM and the mobile service data together. For instance, the SFCMM may be able to use less than 38 packets out of 156 packets of each slot to transmit the main service data.

SFCMM parade indicates the parade capable of maintaining a backward compatibility with a legacy CMM system/decoder and the parade unable to be recognized by the legacy CMM system/decoder.

The data group region indicates a set of a data block or an extension data block. The data group region indicates a prescribed region in a data group. Each data group region may include the mobile service data of a different use.

TPC (Transmission Parameter Channel) can be included in each of the data groups. TPC delivers the information on a data frame or a data group to a receiving side and provides a transmission parameter.

FIC (Fast information channel) transmits a cross layer information (or inter-layer information). The FIC may include a connection information between an ensemble and a mobile service.

FIG. 1 is a diagram of a transmission system according to one embodiment of the present invention.

The transmission system according to one embodiment of the present invention includes a packet adjustment unit 101, a pre-processor 102, a data frame encoder 103, a block processor 104, a signaling encoder 105, a group formatter 106, a packet formatter 107, a packet multiplexer 108, a post-processor 109, a modified data randomizer 110, a systematic/non-systematic RS encoder 111, a data interleaver 112, a non-systematic RS encoder 113, a parity replacer 114, a modified trellis encoder 115, a synchronization multiplexer 116, a pilot inserter 117, a VSB modulator 118, and/or a transmission unit 119. The transmission system according to the present invention may further include a pre-equalizer filter 120.

The packet adjustment unit 101 may be able to compensate a position difference occurring between a service stream including a mobile service stream and the service stream not including the mobile service stream.

The pre-processor 102 may be able to perform a role of forming a mobile service data into a mobile service structure to transmit the mobile service data. The pre-processor 102 may be able to perform an additional FEC coding on the mobile service data. The pre-processor 102 may be able to insert a known data into a data group. The pre-processor 102 enhances transmission/reception performance of the mobile service data in a mobile environment.

The pre-processor 102 may include a data frame encoder 103, a block processor 104, a signaling encoder 105, a group formatter 106, a packet formatter 107 and/or a packet multiplexer 108.

The data frame encoder 103 randomizes a mobile service data and performs an RS encoding and a CRC (Cyclic Redundancy Check) encoding on the mobile service data. The data frame encoder 103 generates an RS frame including the mobile service data. The data frame encoder 103 may include an RS frame divider (not depicted) generating an RS frame portion by separating the RS frame.

The block processor 104 converts the RS frame portion into an SCCC (Serial Concatenated Convolutional Coding) block. The block processor 104 converts a byte of the mobile service data included in the SCCC block into the mobile service data by a bit unit. The block processor 104 performs a convolutional coding of 1/2, 1/3, or 1/4 rate on the mobile service data of bit unit. In this case, the 1/2 rate means that one bit in, two bits out, the 1/3 rate means that one bit in, three bits out, and the 1/4 rate means that one bit in, four bits out. The outputted bits are included in a symbol. The block processor 104 performs an interleaving for the symbol outputted in a manner of being convolutional encoded. The block processor 104 converts the interleaved symbol into a data of byte unit. The block processor 104 converts the SCCC block into a data block.

The signaling encoder 105 generates a signaling information for a signaling of a receiving side. The signaling encoder 105 performs a FEC coding and a PCCC (Parallel Concatenated Convolutional Code) encoding on the signaling information. The signaling information includes a TPC data and/or a FIC data.

The group formatter 106 forms a data group including a mobile service data. The group formatter 106 inserts a FCC coded mobile service data into the data group of interleaved form. The group formatter 106 inserts an initialization data byte and/or a known data sequence (a set of consecutive known data), which is for initialization of a memory of the modified trellis encoder 115, into the data group. The group formatter 106 inserts a position holder for a main service data, the position holder for an MPEG-2 header, and/or the position holder for a non-systematic RS parity into the data group. The group formatter 106 may be able to insert a dummy data to generate a data group of a preferable form. After inserting various kinds of data, the group formatter 106 performs a de-interleaving for the data in the data group of interleaved form. After the de-interleaving is performed, the data group is outputted in a form that the data group is not interleaved. The data group generated in the group formatter 106 includes the mobile service data corresponding to one RS frame portion.

The packet formatter 107 converts an output data of the group formatter 106 into a transport stream (TS) packet. In this case, the TS packet can be called a mobile service data packet. The packet formatter 107 outputs (118+M) number of mobile service data packet for one data group. In this case, 'M' is an integer less than 38.

The packet multiplexer 108 multiplexes a packet including the mobile service data processed by the pre-processor 102 and the packet including the main service data. In one slot, a multiplexed packet includes (118+M) number of mobile service data and 'L' number of main service data packet. 'M' is an integer greater than '0' and less than 38. One embodiment of the present invention is that the total of 'M' and 'L' corresponds to 38. As a different embodiment, in case that the number of main service data packet corresponds to '0' ('L'=0), the packet multiplexer 108 processes the mobile service data only.

The post-processor 109 processes the mobile service data in order for the mobile service data to have a backward compatibility with a legacy broadcasting system. In this process, the main service data can be processes together. According to one embodiment of the present invention, the post-processor 109 may include a modified data randomizer 110, a systematic/non-systematic RS encoder 111, a data interleaver 112, a non-systematic RS encoder 113, a parity replacer 114, and/or a modified trellis encoder 115.

The modified data randomizer 110 does not perform a randomizing for the mobile service data packet and bypasses the mobile service data packet. The modified data randomizer 110 performs the randomizing for the main service data packet. According to one embodiment of the present invention, in case that a data group generated in the pre-processor 102 does not include the main service data, the modified data randomizer 110 may not perform a randomizing process.

In case that an input data corresponds to the main service data packet, the systematic/non-systematic RS encoder 111 performs a systematic RS encoding on the main service data. In case that the input data corresponds to the mobile service data packet, the systematic/non-systematic RS encoder 111 performs a non-systematic RS encoding on the mobile service data. A systematic/non-systematic RS parity generated by the systematic/non-systematic RS encoding can be inserted into a pre-defined position in the data group. In case that the main service data packet is not included in the service data packet, which is multiplexed by the packet multiplexer 108, it is not necessary for the systematic/non-systematic RS encoder 111 to perform the RS encoding for the main service data. In this case, the systematic/non-systematic RS encoder 111 may not generate the non-systematic RS parity for the backward compatibility.

The data interleaver 112 performs an interleaving for the data including the main service data and the mobile service data.

If it is necessary to initialize the modified trellis encoder 115, the non-systematic RS encoder 113 changes a initialization data of the mobile service data to a memory value in a manner of receiving the memory value of the modified trellis encoder 115 and receiving the mobile service data from the data interleaver 112. The non-systematic RS encoder 113 outputs an RS parity, which is generated by performing the non-systematic RS encoding for the changed mobile service data, to the parity replacer 114.

If it is necessary to initialize the modified trellis encoder 115, the parity replacer 114 receives the mobile service data from the data interleaver 112 and then replaces the non-systematic RS parity of the mobile service data with the non-systematic RS parity generated by the non-systematic RS encoder 113.

In case that a packet multiplexed by the multiplexer 108 does not include the main service data packet, it is not necessary to include the RS parity for backward compatibility in the data group. Hence, according to one embodiment of the present invention, in this case, the non-systematic RS encoder 113 and the parity replacer 114 does not perform the aforementioned operations and may be then able to perform an operation of bypassing a received data.

The modified trellis encoder 115 performs a trellis encoding for the output of the data interleaver 112. In order to output a known data in a form determined by a broadcast transmitting side and a broadcast receiving side in advance after the trellis encoding, the memory included in the trellis encoder 115 needs to be initialized before beginning the trellis encoding. The aforementioned initialization operation can start by the initialization data included in the data group.

The synchronization multiplexer 116 inserts a field synchronization signal and a segment synchronization signal into the output data of the modified trellis encoder 115 and multiplexes the data.

The pilot inserter 117 receives the data multiplexed by the synchronization multiplexer 116 and inserts a pilot signal, which is used as a carrier phase by a receiving side to demodulate a channel signal, into the multiplexed data.

The VSB modulator 118 performs a VSB modulation to transmit a broadcast data.

The transmission unit 119 performs a frequency upconverting for the modulated data and transmits the converted data.

Figure 2:
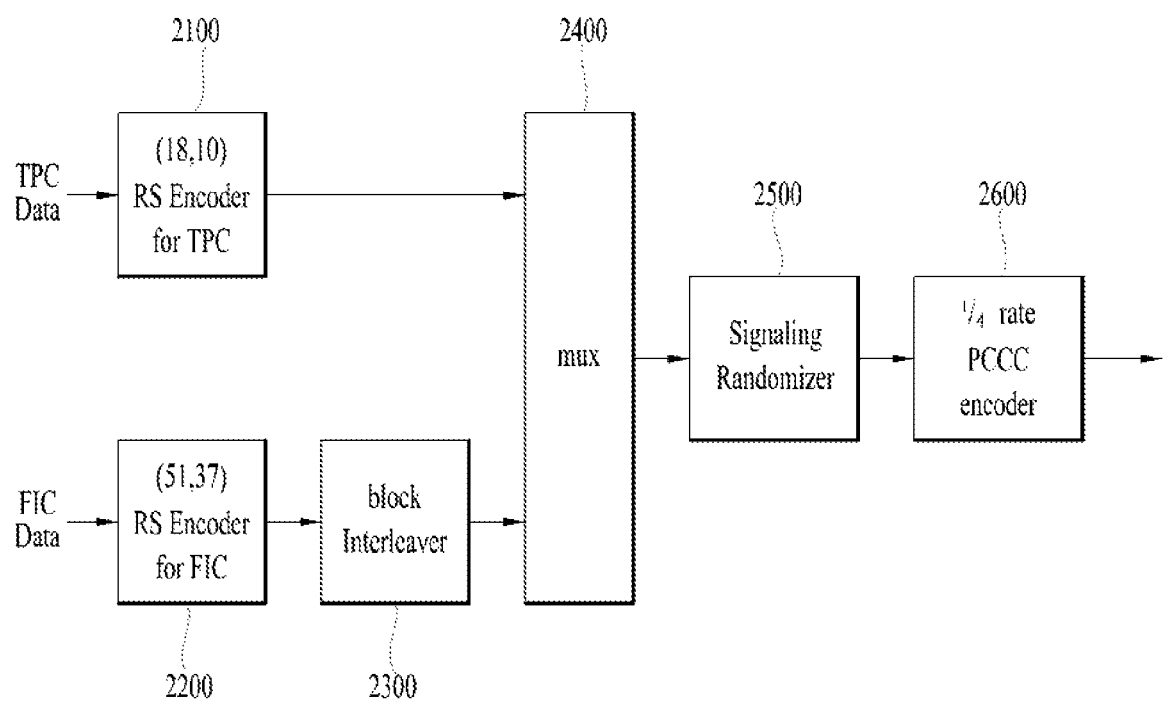
FIG. 2 is a diagram of a signaling encoder according to one embodiment of the present invention.

FIG. 2 is a diagram of a signaling encoder according to one embodiment of the present invention.

The signaling encoder according to one embodiment of the present invention includes a $1^{st}$ RS encoder 2100, a $2^{nd}$ RS encoder 220, a block interleaver 2300, a multiplexer 2400, a signal randomizer 2500, and/or a PCCC encoder 2600.

The $1^{st}$ RS encoder 2100 performs an RS encoding for TPC data.

The $2^{nd}$ RS encoder 2200 performs an RS encoding for FIC data. According to one embodiment of the present invention, the $1^{st}$ encoder and the $2^{nd}$ encoder perform the RS encoding with a rate different from each other. In particular, the TPC data and the FIC data are encoded by the rate different from each other.

The block interleaver 2300 performs a block interleaving for the RS encoded FIC data. The block interleaving is to interleave the FIC data by a block unit.

The multiplexer 2400 multiplexes the RS encoded TPC data and the block interleaved FIC data.

The signal randomizer 2500 randomizes the multiplexed data.

The PCCC encoder 2600 performs a PCCC encoding for the randomized data.

Figure 3:
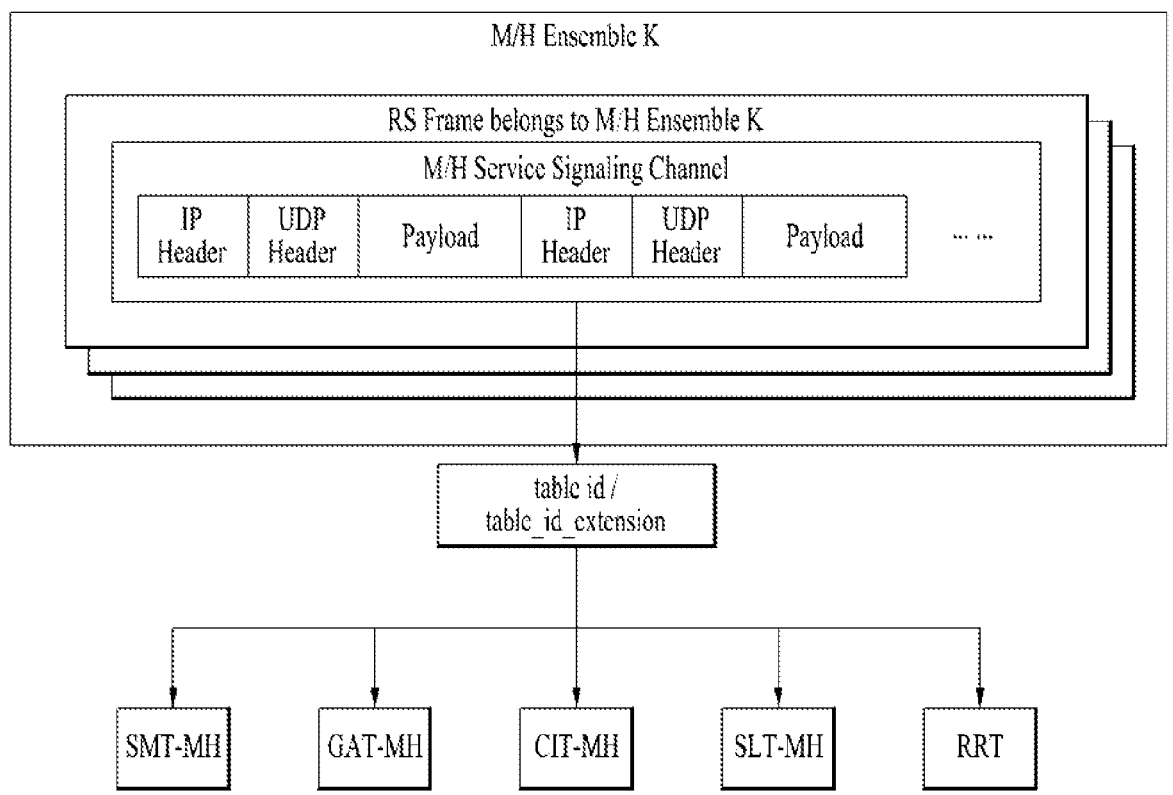
FIG. 3 is a diagram of an ensemble structure according to one embodiment of the present invention.

FIG. 3 is a diagram of an ensemble structure according to one embodiment of the present invention.

The ensemble transmits a mobile service data composing a mobile service. The ensemble may include a service signaling channel (SSC) to signal the mobile service. It is able to define that the service signaling channel is to be transmitted via a specific IP address and an UDP port. In particular, a receiving side may be able to obtain the service signaling data in a manner of parsing the data of the corresponding IP address and the UDP port.

The service signaling channel may include a Service Map Table (SMT) including property information on the mobile service transmitted by the ensemble, a Guide Access Table (GAT) including information on a service guide data of the mobile service, a Cell Information table (CIT) providing carrier frequency information of an adjacent cell transmitting a similar service, a Service Labeling Table (SLT) including information for a prompt mobile service scan of a receiving side, a Rating Region Table (RRT) including information on a viewing rate for the mobile service, and/or a mobile Emergency Alert Table-MH (EAT-MH) including information for transmitting an emergency alert service to a mobile broadcasting.

Figure 4:
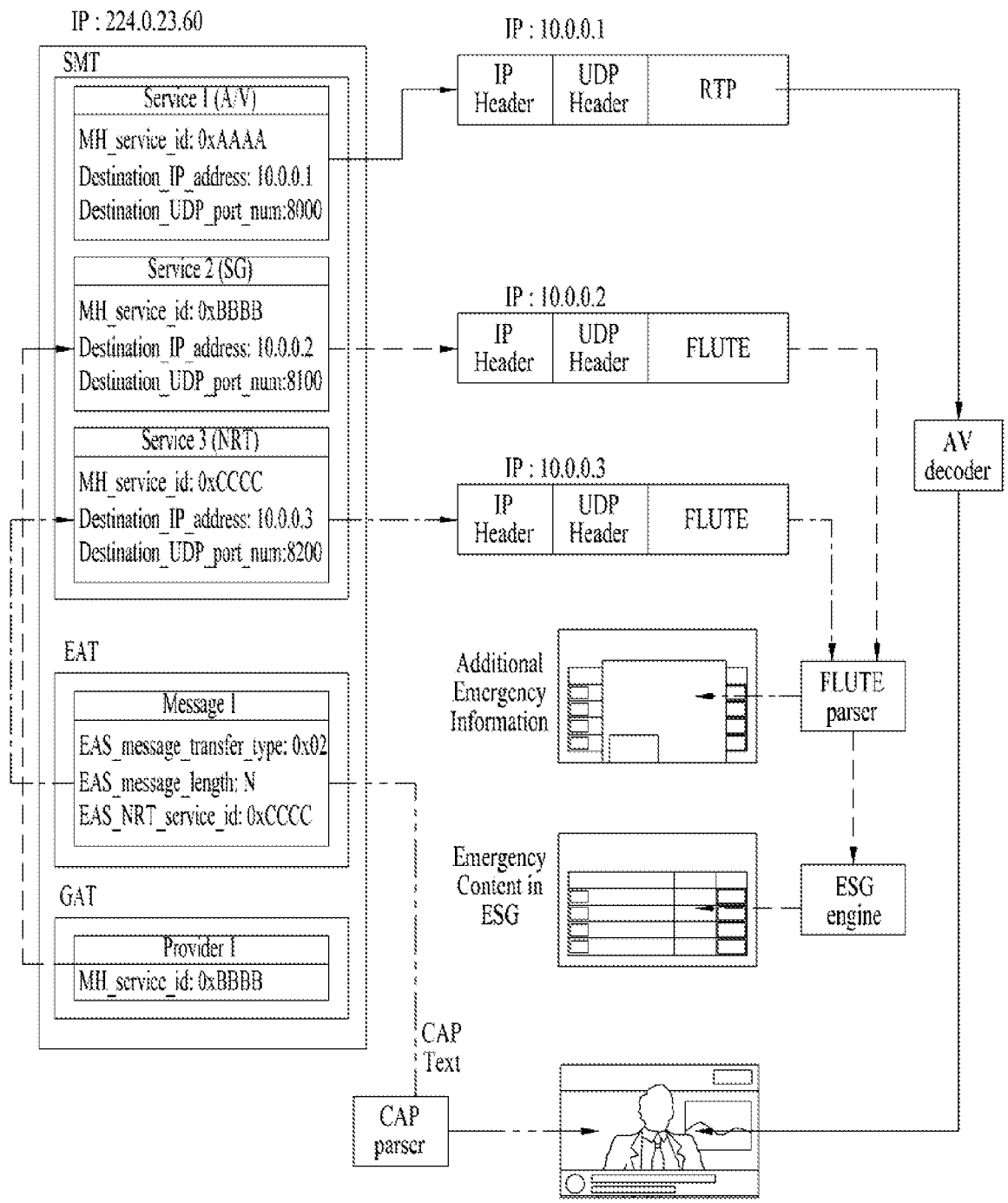
FIG. 4 is a diagram of an emergency alert data processing using a mobile emergency alert table according to one embodiment of the present invention.

FIG. 4 is a diagram of an emergency alert data processing using a mobile emergency alert table according to one embodiment of the present invention.

According to one embodiment of the present invention, a CAP (Common Alerting Protocol) alert message can be compressed to reduce a size of the mobile emergency alert table. A mobile receiver (M/H receiver) capable of identifying the mobile emergency alert table may be able to extract the compressed CAP alert message. In this case, the mobile receiver decompresses the CAP alert message and may be then able to promptly display an emergency alert message in a state of not referenced by the SMT.

The mobile emergency alert table may be able to transmit NRT_service_id for an entry of an emergency alert message. The NRT_service_id indicates that an additional content related to the emergency alert message is transmitted via an NRT (Non-Real-Time) broadcasting service. A broadcast receiver capable of receiving the NRT broadcasting service may be able to display an additional emergency alert message with reference to a FLUTE (File Delivery over Unidirectional Transport), which is signaled for the SMT, a service guide (SG), and/or the NRT service.

The number of repeatedly receiving the mobile emergency alert table may vary according to significance of the emergency alert message. The emergency alert message of highest significance can be repeated on every MH frame.

Referring to FIG. 4, a broadcasting receiver identifies an IP address and UDP port number of a corresponding service in the SMT with reference to MH_service_id of the GAT and parses a FLUTE data transmitted via the IP address and the UDP port. And, the broadcasting receiver may be then able to display that there exists an emergency alert content via an Electronic Service Guide (ESG). The broadcasting receiver identifies an IP address and UDP port number transmitting a service including an emergency alert message transmitted to the NRT with reference to EAS_NRT_service_id of the mobile emergency alert table, parses the FLUTE data transmitted via the IP address and the UDP port, and may be then able to display the emergency alert message. Or, the mobile emergency alert table may include the emergency alert message. In this case, the broadcasting receiver may be able to directly display the emergency alert message in a manner of parsing the emergency alert message via a CAP parser.

FIG. 5 is a diagram of a syntax of a mobile emergency alert table according to one embodiment of the present invention.

The mobile emergency alert table of the present invention may include a table_id field, an EAT_MH_protocol_version field, an ensemble_id field, an automatic_tuning_channel_number field, an automatic_tuning_ts_id field, automatic_tuning_ensemble_id field, an automatic_tuning_service_id field, a num_EAS_messages field, an EAS_message_id filed, a type_of_responder field, a type_of_disciplines field, an EAS_IP_version_flag field, an EAS_message_transfer_type field, an EAS_message_encoding_type field, an EAS_message_length field, an EAS_message_byte field, and/or an EAS_NRT_service_id field.

The table_id field identifies a kind of current table. A broadcasting receiver may be able to identify that the present table corresponds to a mobile emergency alert table by identifying the table_id field of having a specific value.

In case that a structure of a mobile emergency alert table is modified, the EAT_MH_protocol_version field identifies a version number of the table.

The ensemble id field indicates an ID of an ensemble related to the present table.

The automatic_tuning_channel_number field indicates a physical RF channel number for an automatic tuning. For instance, if it is necessary to tune to a channel number broadcasting an emergency alert message by force, the automatic_tuning_channel_number field can be referred.

The automatic_tuning_ts_id field indicates a transport stream ID for an automatic tuning. For instance, if it is necessary to parse a transport stream including an emergency alert message, a corresponding stream can be identified by the automatic_tuning_ts_id field.

The automatic_tuning_ensemble_id field indicates an ensemble ID for an automatic tuning. For instance, the ensemble including an emergency alert message can be identified by the automatic_tuning_ensemble_id field.

The automatic_tuning_service_id field indicates a target A/V service of an automatic tuning. If the automatic tuning is designated in a mobile emergency alert table, the emergency alert table may or may not include an alert message. If the automatic tuning is designated, a broadcasting receiver ignores a corresponding message and tunes to a target channel number.

The num_EAS_messages field indicates the number of emergency alert message included in a mobile emergency alert table.

The EAS_message_id filed identifies a unique ID for transmitting an emergency alert message. This field may change its value in case that a previous emergency alert message is updated or cancelled. As a different embodiment, this field can be extracted from a CAP message ID.

The type_of_responder field indicates a broadcasting responder of an emergency alert message.

The type_of_disciplines field indicates information on an emergency situation, which becomes a target of an emergency alert.

The EAS_IP_version_flag field indicates that an IP_address field includes an IPv4 address, if it is set to '0'. The EAS_IP_version_flag field indicates that the IP_address field includes an IPv6 address, if it is set to '1'.

The EAS_message_transfer_type field indicates a transfer type of an emergency alert message.

The EAS_message_encoding_type field indicates an encoding plan of an emergency alert message.

The EAS_message_length field indicates a compression length of a compressed emergency alert message including an emergency alert.

The EAS_message_byte field indicates a size of a compressed emergency alert message including an emergency alert.

The EAS_NRT_service_id field identifies a service ID of an NRT service providing an additional content related to an emergency alert message. This field can be inserted into the SMT included in an ensemble transmitting an emergency alert table as well.

FIG. 6 is a diagram indicating the meaning of type_of_responder field, type_of_disciplines field, EAS_message_transfer_type field, EAS_message_encoding_type field in accordance with each value according to one embodiment of the present invention.

The type_of_responder field may be able to indicate a case that a viewing target of an emergency alert message is not identified, a case that the viewing target is not a public, or a case that the viewing target is the public according to the value of this field. Or, the type_of_responder field may be able to indicate both the cases that the viewing target is/is not the public, according to the value of this field.

The type_of_disciplines field may be able to indicate a situation of occurrence of an emergency alert system, an explosion event, a fire situation, a dangerous material occurrence event, law enforcement, or a life-saving situation according to the value of this field.

The EAS_message_transfer_type field may be able to indicate a case that a transfer type of an emergency alert message is not identified, a case that an NPT file not including an alert message is transmitted, a case that an emergency alert message is transmitted in a manner of being included in a mobile emergency alert table, or a case that an emergency alert message is transmitted via an IP datagram according to the value of this field.

The EAS_message_encoding_type field may be able to indicate a case that an encoding plan is not identified, a case that an encoding (or a compression) for an emergency alert message was not performed, or a case that an emergency alert message is compressed using gzip algorithm according to the value of this field.

FIG. 7 is a diagram of IP datagram syntax, in case that an emergency alert message transmitted via the IP datagram is identified, according to one embodiment of the present invention.

The IP datagram may include an EAS_message_id field, an EAS_message_length field, and/or an EAS_message_bytes field.

The EAS_message_id field corresponds to a value of an entry of an emergency alert message in a mobile emergency alert table.

The EAS_message_length field indicates a length of each emergency alert message.

The EAS_message_bytes field indicates a size of a compressed emergency alert message.

FIG. 8 is a diagram of a syntax of a FIC segment header according to one embodiment of the present invention.

A mobile broadcasting receiver may operate in a standby mode and may be able to perform a response to an emergency alert message via a wake-up function. The mobile broadcasting receiver capable of performing the wake-up function does not provide a mobile service and may be able to monitor a broadcasting signal transmitted from a broadcasting company even in the state of the standby mode.

The wake-up means to switch a mode of a broadcasting receiver from a sleeping mode (or idle mode) to an active mode for an emergency alert message even in a case that the broadcasting receiver is currently in the sleeping mode.

To consistently monitor a broadcast signal by a mobile broadcasting receiver expedites battery consumption. Hence, a signaling to reduce the battery consumption is necessary. Although a smallest unit for signaling in a mobile broadcasting service is a FIC segment header included in a FIC segment, it is necessary for the broadcasting receiver to receive at least one RS frame to obtain the FIC segment. A change of a FIC Chunk can be noticed by monitoring a TPC. For instance, if a value of a FIC_version field included in the TPC changes, it is able to know there exist a change in the FIC Chunk. If a change is noticed in the FIC_version field of the TPC, the broadcasting receiver turns on the power of the broadcasting receiver and receives an RS frame to gather the FIC segment. If there exists a wake-up signal in the FIC Chunk, a wake-up indicator in the FIC segment header can be used to judge whether the mobile broadcasting receiver is woke up.

The FIC Chunk is transmitted in a manner of being divided into a plurality of FIC segment payloads. The FIC segment includes a FIC segment header and a FIC segment payload. The FIC segment is transmitted via one data group.

The FIC segment header includes a FIC_segment_type field, a wake_up_indicator field, a FIC_chunk_major_protocol_version field, a current_next_indicator field, an error_indicator field, a FIC_segment_num field, and/or a FIC_last_segment_num field.

The FIC_segment_type field indicates a kind of data transmitted by the FIC segment. The FIC_segment_type field may indicate that the FIC segment payload transmits a part of the FIC Chunk or indicate that the FIC segment payload does not include a meaningful data according to a value of the field.

The wake_up_indicator field indicates whether a mobile broadcasting receiver capable of performing a wake-up function automatically turns the power on and then provides an emergency alert message. For instance, the mobile broadcasting receiver can be controlled to ignore a wake-up process and then continuously perform a former function or to instantly perform the wake-up function according to the value of the wake_up_indicator field.

The FIC_chunk_major_protocol_version field indicates a major protocol version of the FIC Chunk partially transmitted by the FIC segment. This value can be set to an identical value of the FIC_chunk_major_protocol_version field included in the FIC Chunk header.

The current_next_indicator field indicates a current or a next state of the FIC Chunk partially transmitted by the FIC segment.

The error_indicator field indicates whether an error is detected in the FIC segment.

The FIC_segment_num field indicates the number of the FIC segment. It may be able to indicate that the FIC segment including the FIC segment payload included in the FIC Chunk is nth FIC segment.

The FIC_last_segment_num field indicates the number of the last FIC segment. It may be able to indicate that the last FIC segment among the FIC segment including the FIC segment payload included in the FIC Chunk is nth FIC segment.

FIG. 9 is a diagram of a syntax of a FIC Chunk payload according to one embodiment of the present invention.

A mobile broadcasting receiver capable of performing a wake-up function may be monitoring the FIC_version field in the TPC. Having sensed a change of the FIC_version field, the mobile broadcasting receiver may start an operation of gathering the FIC segment. If the wake_up_indicator field of the FIC segment header indicates that the wake-up function is needed to be performed, the mobile broadcasting receiver may receive an ensemble including a mobile emergency alert table in a service signaling channel. In this case, the corresponding ensemble can be identified by an EAT_ensemble_indicator field.

The FIC Chunk payload includes an ensemble_id field, an ensemble_protocol_version field, an SLT_ensemble_indicator field, a GAT_ensemble_indicator field, an EAT_ensemble_indicator field, an MH_service_signaling_channel_version field, a num_MH_services field, an MH_service_id field, a multi-ensemble_service field, an MH_service_status field, and/or an SP_indicator field.

The ensemble_id field identifies an ensemble signaled by a corresponding FIC.

The ensemble_protocol_version field indicates version information of an ensemble structure.

The SLT_ensemble_indicator field indicates whether a signaling channel included in an ensemble includes a service labeling table.

The GAT_ensemble_indicator field indicates whether a signaling channel included in an ensemble includes a guide access table.

The EAT_ensemble_indicator field indicates whether a signaling channel included in an ensemble includes a mobile emergency alert table. Or, the EAT_ensemble_indicator field indicates that the mobile emergency alert table is transmitted to a signaling stream of this ensemble.

The MH_service_signaling_channel_version field indicates a version of a service signaling channel included in an ensemble.

The num_MH_services field indicates the number of MH service signaled via an ensemble.

The MH_service_id field identifies an MH service.

The multi-ensemble_service field indicates whether an MH service is transmitted via more than one ensemble.

The MH_service_status field indicates whether an MH service is activated and/or whether the MH service is hidden according to a value of the MH_service_status field.

The SP_indicator field indicates whether a service protection is applied to at least one or more component configured to provide an MH service.

Figure 10:
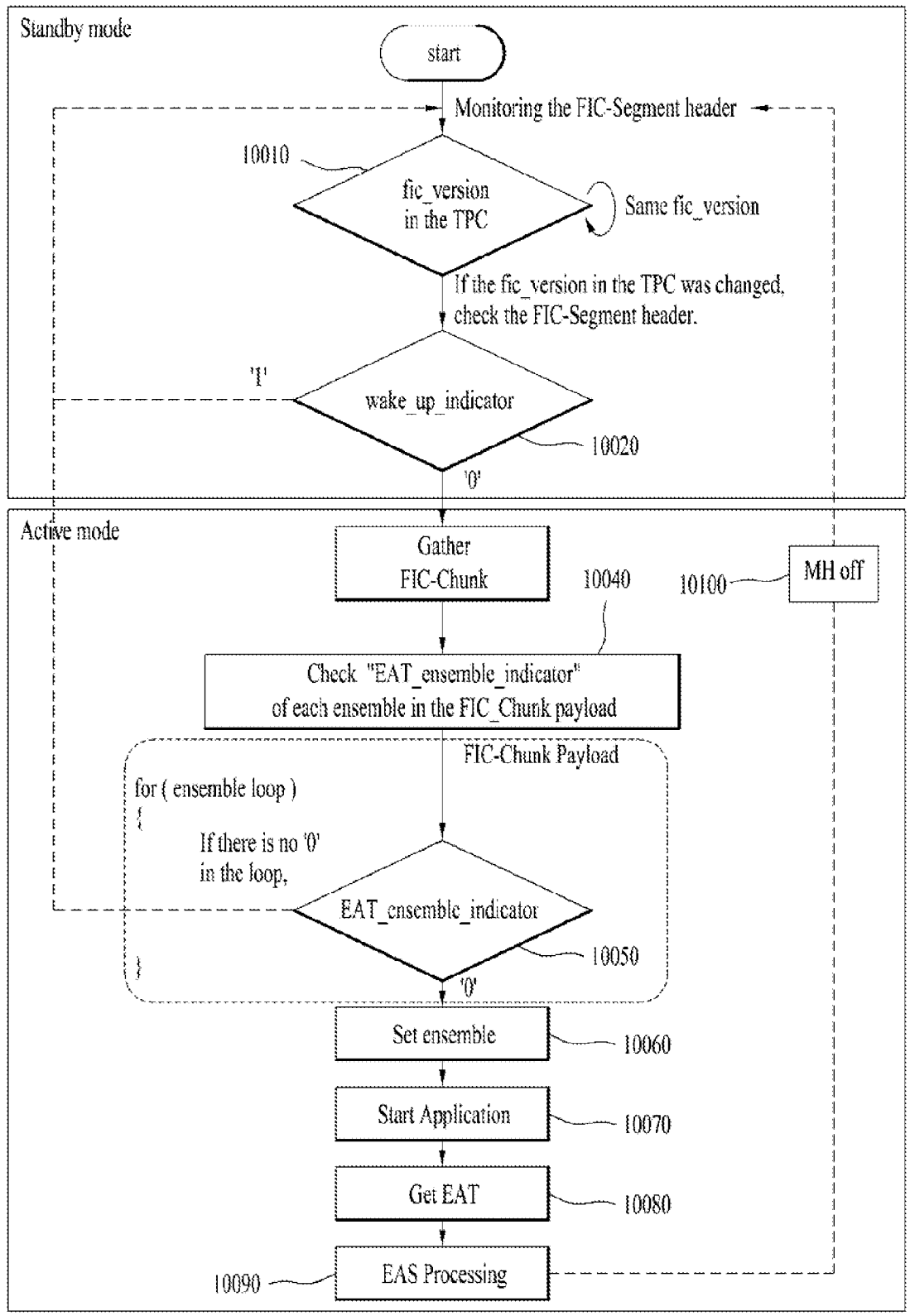
FIG. 10 is a flowchart of data processing to perform a wake-up function according to one embodiment of the present invention.

FIG. 10 is a flowchart of data processing to perform a wake-up function according to one embodiment of the present invention.

The mobile broadcasting receiver monitors the FIC segment header or the TPC. If there is no change in the FIC_version field, the mobile broadcasting receiver continuously performs the monitoring. If there exist a change in the FIC_version field, the mobile broadcasting receiver checks the FIC segment header [S10010]. If the wake_up_indicator field in the FIC segment header indicates that a wake-up function is not performed, the mobile broadcasting receiver continuously monitors the FIC segment header or the TPC. If the wake_up_indicator field indicates that the wake-up function is needed to be performed, the mobile broadcasting receiver completes a FIC Chunk in a manner of gathering the FIC segment [S10030]. The mobile broadcasting receiver checks the EAT_ensemble_indicator of the FIC Chunk payload [S10040]. If the EAT_ensemble_indicator indicates the ensemble transmitting the mobile emergency alert table [S10050], the mobile broadcasting receiver starts to parse/decode on the corresponding ensemble [S10060]. If an application is required to provide an emergency alert message, the mobile broadcasting receiver may start the application [S10070]. The mobile broadcasting receiver obtains the mobile emergency alert table from the corresponding ensemble [S10080], parses and displays the emergency alert message using the table [S10090]. Having completed the aforementioned process, the mobile broadcasting receiver turns the power off [S10100].

FIG. 11 is a diagram of a syntax of a FIC chunk header according to one embodiment of the present invention.

In case that a wake-up indicator is ignored by a user, it is necessary for the broadcasting receiver to ignore a repetitive transmission for an identical wake-up event The FIC Chunk header may include a FIC_chunk_major_protocol_version field, a FIC_chunk_minor_protocol_version field, a FIC_chunk_header_extension_length field, an ensemble_loop_header_extension_length field, an MH_service_loop_extension_length field, a current_next_indicator field, a transport_stream_id field, an EAS_wake_up_extended_info field, an EAS_wake_up_extended_info_Tag field, an EAS_wake_up_version_number field, and/or a num_ensembles field.

The FIC_chunk_major_protocol_version field indicates a major version for a syntax of a FIC Chunk. A change of a major level indicates a syntax change of the FIC Chunk in a range that a backward compatibility is not maintained.

The FIC_chunk_minor_protocol_version field indicates a minor version for a syntax of the FIC Chunk. A change of a minor level indicates a syntax change of the FIC Chunk in a range that a backward compatibility is maintained. According to one embodiment of the present invention, the FIC_chunk_minor_protocol_version field may be able to indicate that a wake-up signaling extension for an emergency alert system exists in the FIC Chunk.

The FIC_chunk_header_extension_length field indicates a length of fields extended in the FIC Chunk header by the change of the minor level of the syntax of the FIC Chunk. The FIC_chunk_header_extension_length field may be able to indicate a length of a field extended by a wake-up signaling extension.

The ensemble_loop_header_extension_length field indicates a length of an extension field of the header of the num_ensemble loop in the FIC Chunk payload added by the change of the minor level of the syntax of the FIC Chunk.

The MH_service_loop_extension_length field indicates a length of an extension field of num_MH_services loop entry in the FIC Chunk payload added by the change of the minor level of the syntax of the FIC Chunk.

The current_next_indicator field indicates whether the FIC chunk is applicable to a current MH frame or a next MH frame.

The transport_stream_id field performs a role of a label to identify a mobile broadcasting.

The EAS_wake_up_extended_info field includes information on a field extended for a wake-up function.

The EAS_wake_up_extended_info_Tag field indicates a type of extended FIC Chunk header. For instance, the EAS_wake_up_extended_info_Tag field may be able to indicate a size of a field extended for a wake-up function.

The EAS_wake_up_version_number field indicates a version information of a wake-up signaling.

The num_ensembles field indicates the number of ensemble transmitted via a physical transport channel in relation to the FIC Chunk.

Figure 12:
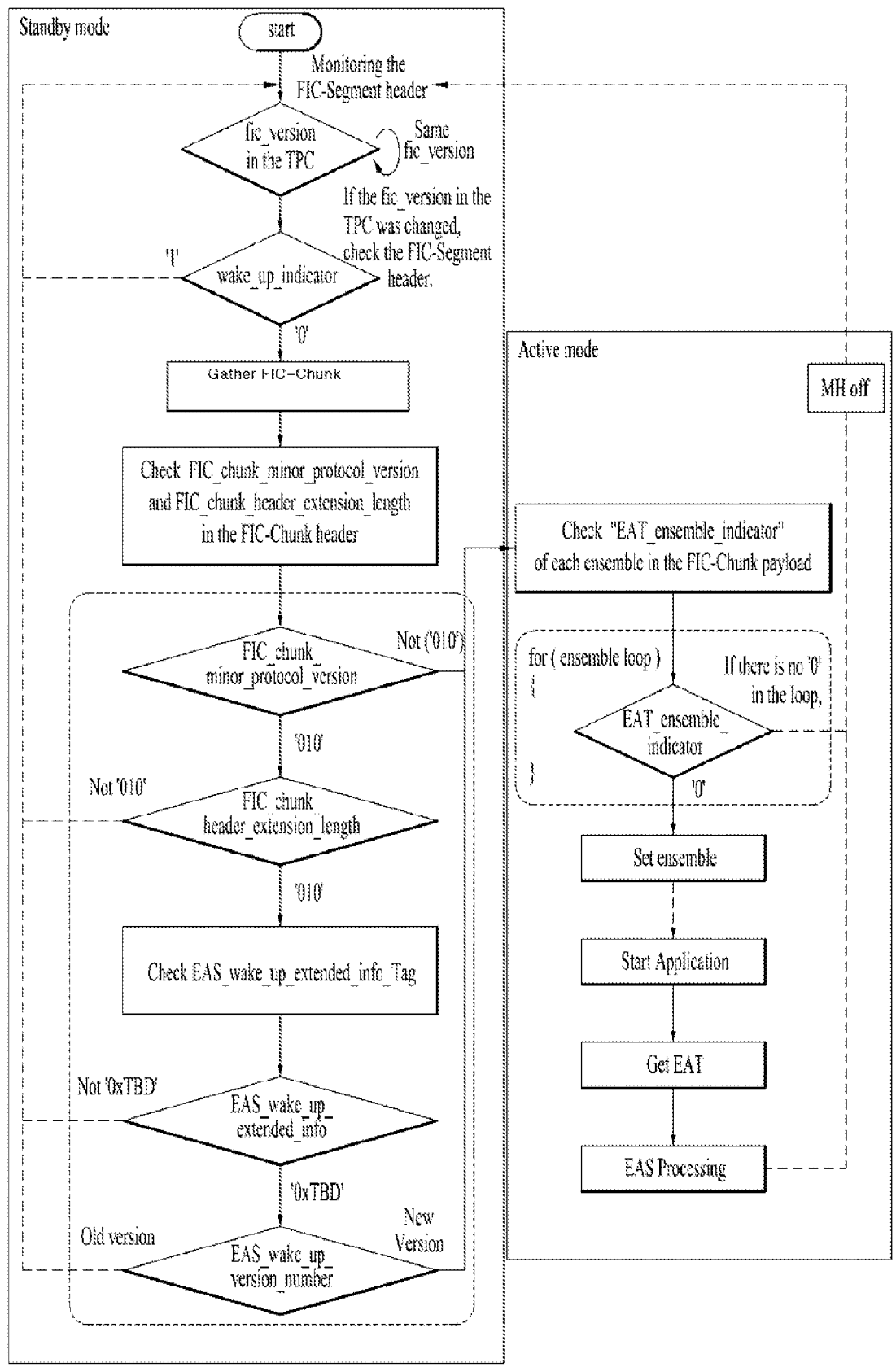
FIG. 12 is a diagram of a procedure processing a version information of a wake-up signaling via an extension of a FIC chunk header according to one embodiment of the present invention.

FIG. 12 is a diagram of a procedure processing a version information of a wake-up signaling via an extension of a FIC chunk header according to one embodiment of the present invention.

The broadcasting receiver monitors the FIC_version field included in the TPC. In case that the FIC_version field is modified, the broadcasting receiver checks the FIC segment header. If the wake_up_indicator field indicates that a wake-up function is needed to be performed, the broadcasting receiver receives the FIC Chunk and checks the FIC_chunk_minor_protocol_version field and/or the FIC_chunk_header_extension_length field. If the FIC_chunk_minor_protocol_version field indicates that there exists a change in the FIC Chunk for the wake-up signaling, the broadcasting receiver parses the FIC_chunk_header_extension_length field. If the FIC_chunk_header_extension_length field indicates that there exists an extension of the FIC Chunk header for the wake-up signaling, the broadcasting receiver checks the EAS_wake_up_extended_info field in the FIC Chunk header. The broadcasting receiver confirms an extended field via the EAS_wake_up_extended_info_Tag field and judges whether there is a change in the version of the wake-up signaling via the EAS_wake_up_version_number field. If there exists a change in the version of the wake-up signaling, the broadcasting receiver checks the EAT_ensemble_indicator field in the FIC Chunk payload and obtains the mobile emergency alert table from the ensemble transmitting the mobile emergency alert table. The broadcasting receiver processes the emergency alert system using the obtained mobile emergency alert table.

Figure 13:
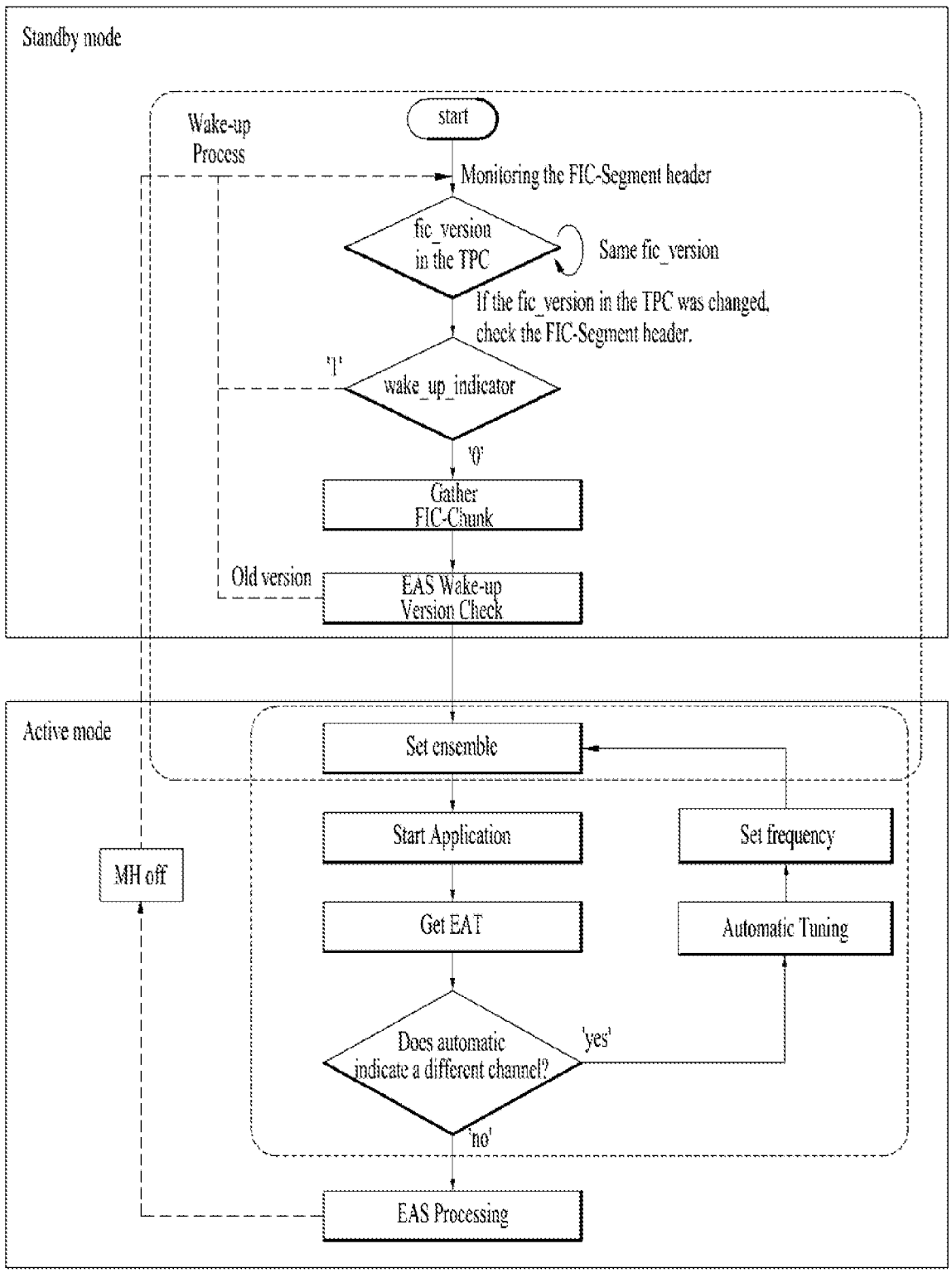
FIG. 13 is a diagram of a procedure processing an auto tuning to an important emergency alert of a wake-up operation according to one embodiment of the present invention.

FIG. 13 is a diagram of a procedure processing an auto tuning to a significant emergency alert of a wake-up operation according to one embodiment of the present invention.

In case that an auto tuning information is provided, the broadcasting receiver may be able to provide the auto tuning to a significant emergency alert as a part of the wake-up operation.

The broadcasting receiver monitors the FIC_version field included in the TPC. In case that the FIC_version field is modified, the broadcasting receiver checks the FIC segment header. If the wake_up_indicator field indicates that a wake-up function is needed to be performed, the broadcasting receiver receives the FIC Chunk and checks the version of the wake-up signaling. If there is a change in the version of the wake-up signaling, the broadcasting receiver receives an ensemble including the mobile emergency alert table. If the fields included in an automatic_tuning_info field in the mobile emergency alert table indicate that an automatic tuning to a different channel is needed, a tuning to a frequency of a target of the automatic tuning is performed. The broadcasting receiver obtains an ensemble from the corresponding frequency and executes the emergency alert system using the mobile emergency alert table included in the ensemble.

FIG. 14 is a diagram of a FLUTE FDT (File Delivery Table) instance according to one embodiment of the present invention.

According to one embodiment, it is necessary to modify the FDT instance to permit 0 file to be transmitted via a FLUTE session transmitting an NRT file.

An element of the FLUTE FDT instance transmitted in an NRT broadcasting service for an emergency alert follows a content of OMA BCAST.

FIG. 15 is a diagram of a TPC syntax for a wake-up signaling using a TPC according to a different embodiment of the present invention.

According to a different embodiment a wake_up_indicator and a wake_up_version_number can be added to the TPC data. In this case, the broadcasting receiver may be able to judge whether to perform a wake-up function for an emergency alert with the TPC data only. In doing so, it may be able to reduce battery consumption compared to the wake-up function performed using the aforementioned FIC Chunk. In particular, since it is not necessary for the broadcasting receiver to complete the FIC Chunk by gathering the FIC segment, the aforementioned operation can be omitted, thereby reducing the battery consumption.

According to one embodiment of the present invention, the wake-up function can be performed by adding the wake_up_indicator and the wake_up_version_number information to the TPC data (Transmission Parameter Channel data) described in ATSC A/153 Part 2. Hence, although a part of the fields included in the TPC is omitted in FIG. 15, it may refer to the ATSC A/153 Part 2. And, the field not having a separate explanation among the field included in the TPC depicted in FIG. 15 may refer to the content written in the ATSC A/153 Part 2.

The TPC data may include the wake_up_indicator field, and/or the wake_up_version_number field.

The wake_up_indicator field assigns 1 bit using a legacy reserved bit. The wake_up_indicator field indicates whether the broadcasting receiver performs the wake-up function. For instance, if a value of the wake_up_indicator field corresponds to '0', the broadcasting receiver should perform the wake-up function in case that the broadcasting receiver is in a standby mode. If the value of the wake_up_indicator field corresponds to '1', the broadcasting receiver maintains a former state. In particular, the broadcasting receiver can be controlled to continuously monitor the TPC in case that the broadcasting receiver is in a standby mode and can be controlled to continuously play an A/V in case that the broadcasting receiver was playing the A/V.

The wake_up_version_number field indicates a version information of a wake-up signaling. The broadcasting receiver may be able to judge whether it is a new wake-up before the broadcasting receiver receives a FIC in a manner of switching from a standby mode to an active mode by comparing a value of the wake_up_version_number field with a pre-received value of the wake_up_version_number field.

FIG. 16 is a diagram of a syntax of a FIC segment header according to a different embodiment of the present invention.

According to a different embodiment of the present invention, the mobile broadcasting receiver may be able to correspond to two wake-ups by assigning 2 bits to the wake_up_indicator included in the FIC segment header.

The content of syntax of the FIC segment header is substituted with the aforementioned content.

There exists very low possibility of occurrence of a disaster strong enough to perform a wake-up. In case that one wake-up (wake-up 1) is delivered to a receiver, the receiver may be turned on by force and a user may be able to terminate the wake-up 1 by force while watching a program. In this case, a wake-up signaling corresponding to the same wake-up 1 can be continuously transmitted. In this case, the broadcasting receiver may be able to judge whether the wake-up signaling corresponds to a wake-up delivered after the user terminated by force using the wake_up_indicator field of 2 bits. In particular, in case of transmitting a signaling of wake-up 2 due to a strong disaster corresponding to the wake-up 2 delivered afterward, it is possible to turn the broadcasting receiver on again by force. Therefore, it may be necessary to have a function of distinguishing between a previously received wake-up and a newly received wake-up in a manner of assigning 2 bits to the wake_up_indicator field.

FIG. 17 is a diagram of an ESG content fragment according to a different embodiment of the present invention.

According to a different embodiment of the present invention, an emergency alert system does not use an NRT service different from each other for each emergency alert message and may be able to use an identical NRT service for all of the emergency alert messages. In this case, the ESG content fragment may be able to include a new element to find out that each of NRT contents is related to which message.

The ESG content fragment according to a different embodiment of the present invention may include an EAS_Content_message_ID field, and/or an EAS_Content_message_TAG field.

The EAS_Content_message_ID field may be able to have a same value with an ID of the emergency alert message specified in a mobile emergency alert table.

The EAS_Content_message_TAG field corresponds to a usable value when an NRT list is shown. For instance, if the emergency alert message is about a 'typhoon', a TAG may have such a value as a 'typhoon alert'. This TAG value is assigned to an ESG server installed in a local station.

Figure 18:
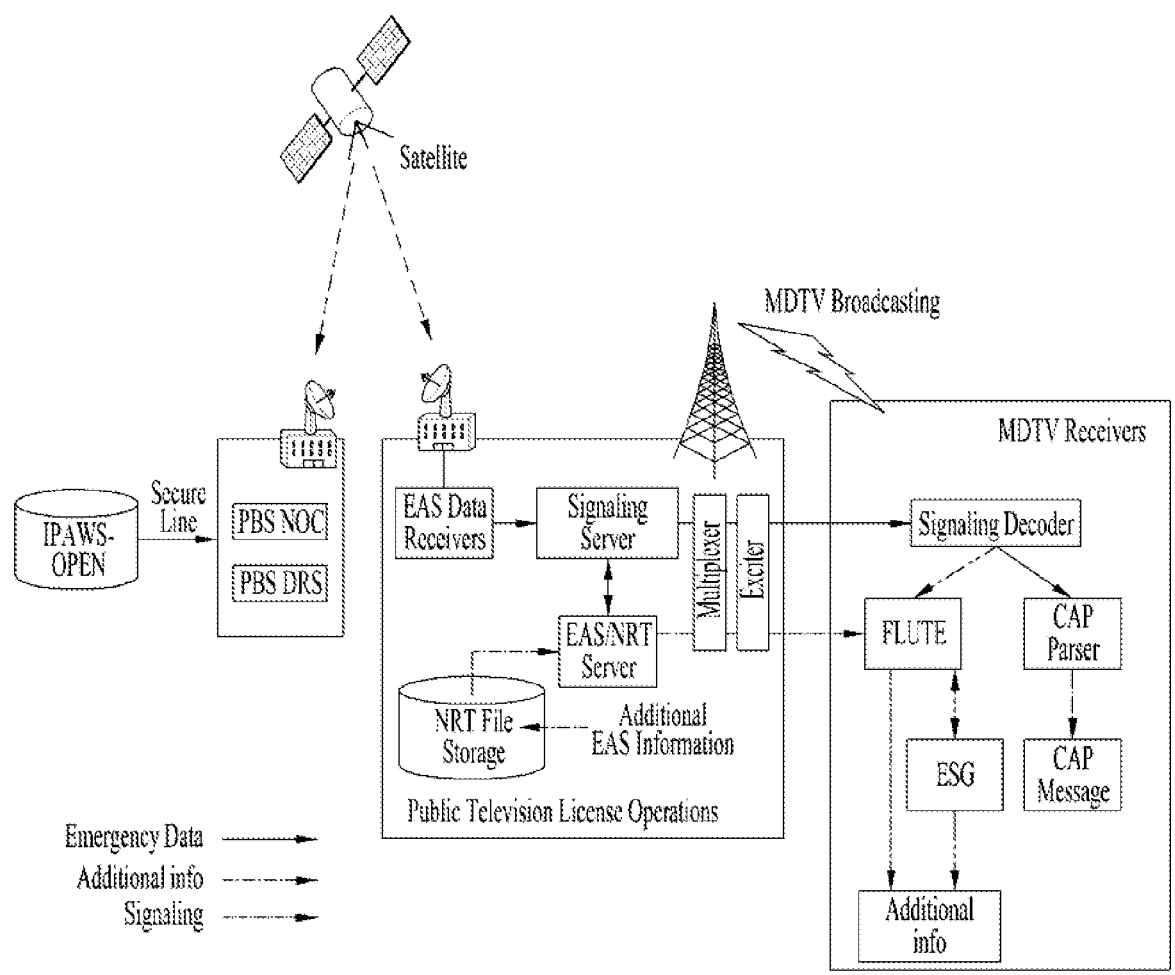
FIG. 18 is a diagram of an emergency alert system according to one embodiment of the present invention.

FIG. 18 is a diagram of an emergency alert system according to one embodiment of the present invention.

A PBS (Public broadcasting Service) brings an emergency alert message from an IPAWS (integrated Public Alert and Warning System)-OPEN via a Secure Line and then sends a corresponding message to a local PBS station via a satellite network. The emergency alert message sent to the local PBS station is made into a mobile emergency alert table in an MDTV (Mobile Digital television) signaling server and then transmitted to an MDTV network via a multiplexer and an exciter.

If an MDTV receiver receives this signal, the MDTV receiver parses the mobile emergency alert table using a signaling decoder and extracts a text of the emergency alert message to be displayed in a screen in a manner of parsing the emergency alert message existing inside of the mobile emergency alert table.

A flow of additional information on the emergency alert message via the NRT can be performed as follows.

As a first method, the local PBS station makes additional information files related to a disaster and stores the files in an NRT file storage used by an MDTV NRT server. The MDTV NRT server forms a signaling information related to the files stored in the NRT file storage and then transmits the files in Non-Real-Time. The files are also delivered via the MDTV network using the multiplexer and the exciter. The broadcasting receiver receives the files in a manner of figuring out the information on the files transmitted to the NRT using a FLUTE/ESG function and then may be able to display them in a screen of the broadcasting receiver.

Or, as a second method, the NRT file is not generated at each of the local PBS stations but transmitted by including URI information indicating additional information inside of a CAP message when the IPAWS-OPEN gives an emergency alert message. In this case, <uri> element, which is a sub element of <resource> element of CAP, can be used. The MDTV signaling server may be able to bring a resource file by extracting the URI information of the CAP message and then transmits the resource file via the MDTV network using the NRT. The flow proceeding after this is identical to the aforementioned method.

A recipient of an emergency alert message of a mobile emergency alert system can be divided into a public and a non-public. A non-public user can be defined as a first responder. The non-public user refers to the people have an ability to process each of the disasters. For instance, in case of fire, 911 may correspond to the first responder. The mobile emergency alert table defines a type of receiver/recipient to which an emergency alert message should be delivered and also defines which discipline is applied to deliver the emergency alert message in case that a recipient corresponds to the first responder. The content on this is substituted with the aforementioned content.

Figure 19:
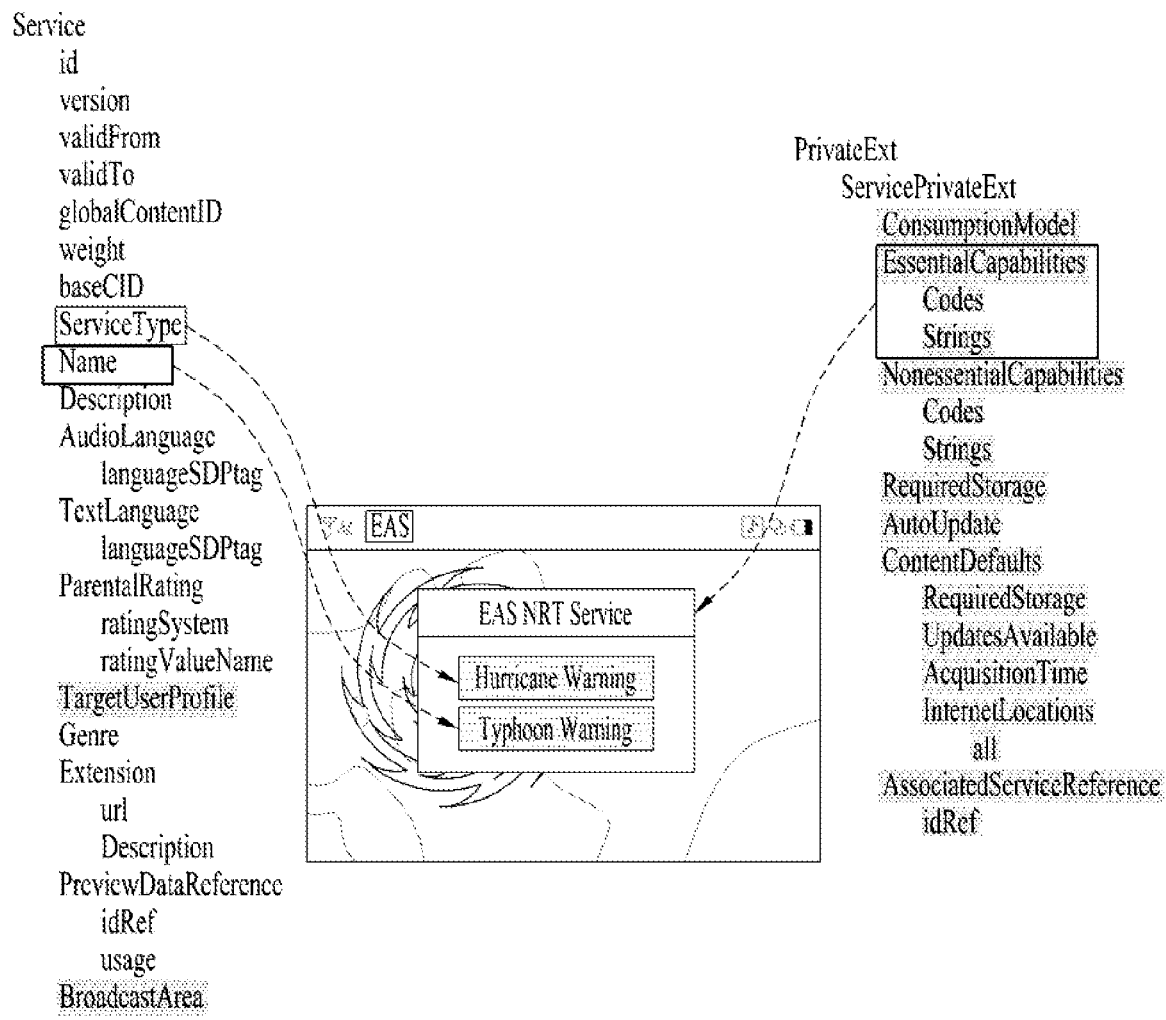
FIG. 19 is a diagram of a screen providing additional information of an emergency alert message using an NRT according to one embodiment of the present invention.

FIG. 19 is a diagram of a screen providing additional information of an emergency alert message using an NRT according to one embodiment of the present invention.

As mentioned in the foregoing description, in a mobile emergency alert system, a broadcasting receiver may be able to display additional information related to a disaster using files transmitted in Non-Real-Time. A plurality of emergency alert messages can be simultaneously transmitted by the mobile emergency alert system. In this case, there may exist NRT additional information different from each other for each of the emergency alert messages. In a mobile NRT environment, all informations related to the NRT can be included in an ESG. Hence, all MDTV receivers should have an ESG function and the additional information can be displayed to a user after the ESG is updated. After updating the ESG, the MDTV receiver displays each of the NRT services in a screen in a manner of reading each of the NRT services from a service fragment of the ESG. Referring to FIG. 19, in case that two emergency alert messages for a Hurricane and a Typhoon are sent, the service fragment of the ESG reading from a receiver to show a list of the NRT service related to each of the messages is disclosed. The information indicated by the name of each fragment can be provided as additional information of the emergency alert message.

Figure 20:
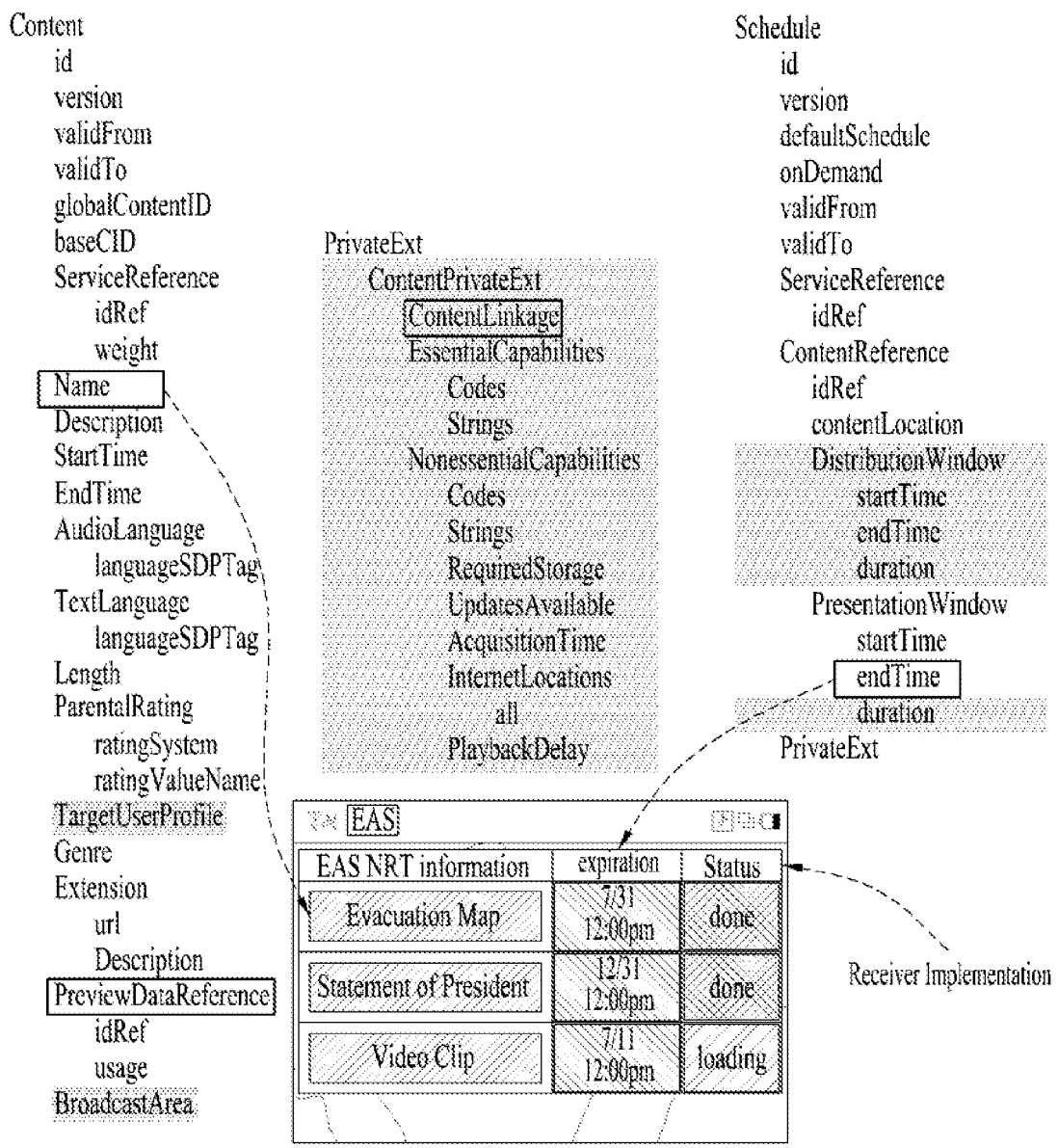
FIG. 20 is a diagram of a screen providing additional information of an emergency alert message using an NRT according to a different embodiment of the present invention.

FIG. 20 is a diagram of a screen providing additional information of an emergency alert message using an NRT according to a different embodiment of the present invention.

If a user selects a service from a list of the NRT service related to the emergency alert message, the receiver may be able to display a list of the content related to the service. The information related to the content can be transmitted in a manner of being included in the ESG. The NRT content information is recorded in a content fragment of the ESG and the receiver may be able to display a list of information on a name of the content, and/or an expiration data, etc. by searching for content items that reference the service selected by the user.

Each of NRT files providing additional information of the emergency alert message is transmitted to the broadcasting receiver via the FLUTE and stored in the storage inside of the broadcasting receiver. If the user wants to see the corresponding additional information, the broadcasting receiver displays the corresponding additional information by reading a corresponding file.

Figure 21:
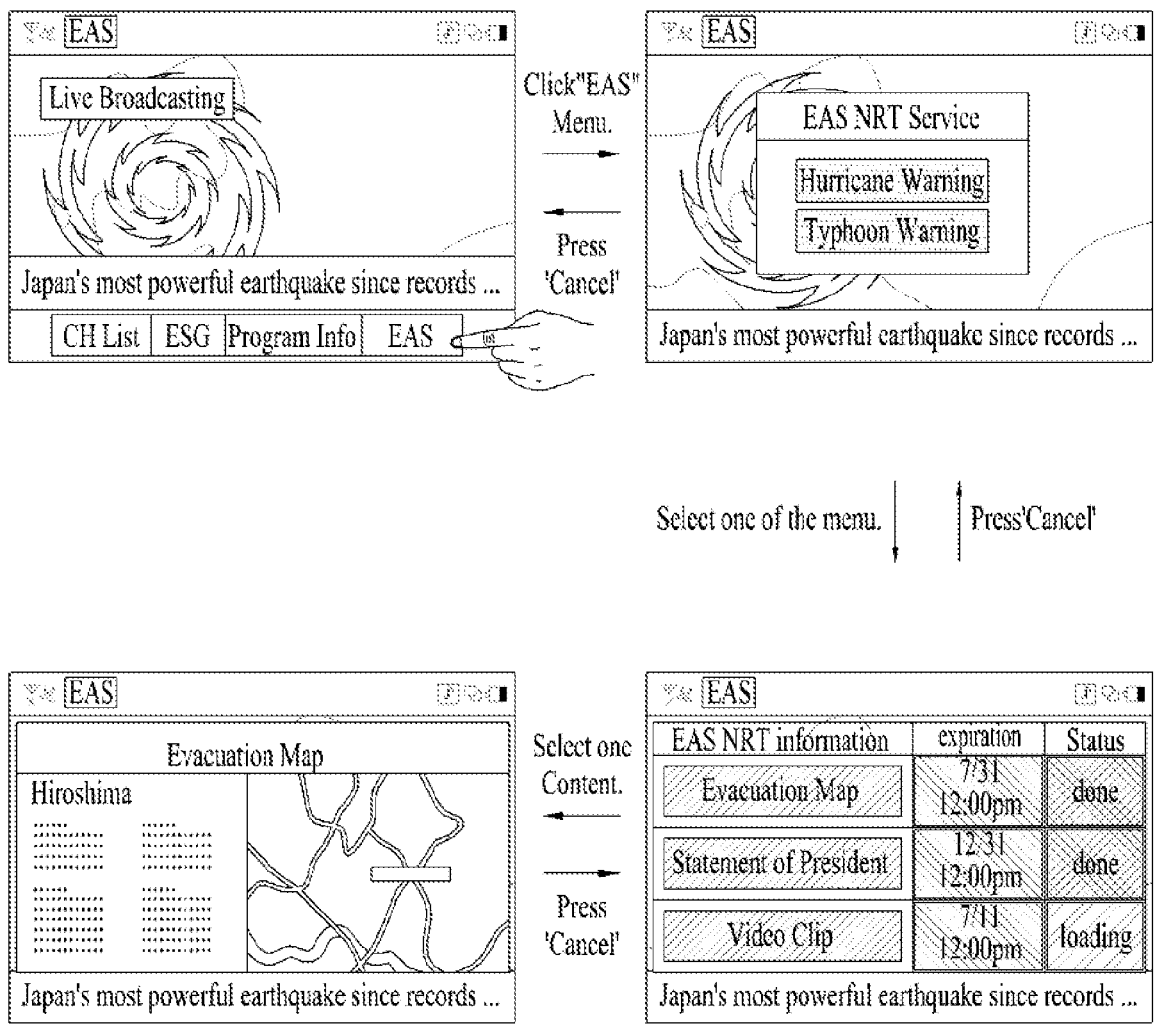
FIG. 21 is a diagram of an UI of a mobile emergency alert system according to one embodiment of the present invention.

FIG. 21 is a diagram of an UI of a mobile emergency alert system according to one embodiment of the present invention.

Since a text of an emergency alert message is sent via a mobile emergency alert table, a mobile broadcasting receiver displays the emergency alert message after completing an extraction job for the emergency alert message in a manner of receiving related signaling information.

In order to show additional information of the emergency alert message, the mobile broadcasting receiver may be able to display a menu in a manner of generating the menu with a name of EAS. In case that there exist a plurality of NRT services, the mobile broadcasting receiver shows an NRT service list related to an emergency alert when a user selects the EAS menu. If the user selects a service, the mobile broadcasting receiver displays a content list related to the service in a screen in a manner of constructing with informations on a name, expiration data, and/or a file reception status, and the like. Referring to FIG. 21, in case that the user selects an evacuation map in the content list, a corresponding map is displayed in the screen.

FIG. 22 is a diagram of a syntax of a mobile emergency alert table according to a different embodiment of the present invention.

If there does not exist a parser capable of parsing an emergency alert message file in a mobile broadcasting receiver, it may be unable to interpret the information included in the corresponding file. Yet, it is necessary to deliver an emergency alert message to the corresponding mobile broadcasting receiver even in the aforementioned situation.

A mobile emergency alert table according to a different embodiment of the present invention may include an event_code field, an event_urgency field, an event_severity field, an event_certainty field, an EAS_message_type field, a num_referenced_messages field, a referenced_message_id field, an event_expiry_time field, a num_geo_code field, a geo_code field, an alert_text_length field, and/or an alert_text( ) descriptor.

The event_code field indicates a code for an event related to an emergency alert message.

The event_urgency field indicates an extent of urgency of a response for an event related to an emergency alert message.

The event_severity field indicates an extent of severity of an event related to an emergency alert message.

The event_certainty field indicates an extent of certainty of an event related to an emergency alert message.

The EAS_message_type field indicates a type of an emergency alert message.

The num_referenced_messages field indicates the number of message referenced by a current emergency alert message among the emergency alert messages already transmitted.

The referenced_message_id field indicates an ID of an emergency alert message referenced by a current emergency alert message.

The event_expiry_time field indicates an expiry time of information included in an emergency alert message.

The num_geo_code field indicates the number of code indicating a region affected by an emergency alert message.

The geo_code field indicates a code indicating a region affected by an emergency alert message.

The alert_text_length field indicates a length of a text of an emergency alert.

The alert_text( ) field indicates a text of an emergency alert. Or, the alert_text( ) can be defined as a form of a descriptor. In this case, the alert_text( ) can be defined as the descriptor including additional information on the text of the emergency alert.

Explanation on the different fields, not having a separate explanation among the fields included in the mobile emergency alert table depicted in FIG. 22, is substituted with the aforementioned explanation on one embodiment of the present invention.

According to a different embodiment of the present invention, by defining a new table including information itself specified in an emergency alert message file and transmitting the table, a broadcasting receiver may be able to use an emergency alert message even though the broadcasting receiver does not have a parser of the emergency alert message file.

FIG. 23 is a diagram of a definition for a value available to an event_urgency field, an event_severity field, an event_certainty field, and an EAS_message_type field according to a different embodiment of the present invention.

The event_urgency field may be able to indicate a case that an emergency alert indicates about a past event, a case that the emergency alert indicates about a future event, a case that the emergency alert indicates about a current event, or a case that the emergency alert indicates an unknown of the extent of urgency of a corresponding event indicated by the emergency, according to a value of this field.

The event_severity field may be able to indicate a case that the severity of an event of an emergency alert is low, a case that the severity of an event of an emergency alert is middle, a case that the severity of an event of an emergency alert is severe, a case that the severity of an event of an emergency alert is extremely severe, or a case that the severity of an event of an emergency alert is unknown, according to a value of this field.

The event_certainty field may be able to indicate a case that a possibility of occurrence of an event related to an emergency alert is very low, a case that a possibility of occurrence of an event related to an emergency alert is intermediate, a case that a possibility of occurrence of an event related to an emergency alert is high, a case that an event related to an emergency alert is currently observed, or a case that a possibility of occurrence of an event related to an emergency alert is unknown, according to a value of this field.

The EAS_message_type field may be able to indicate a case that a transmitted emergency alert message is an emergency alert message for a new event, a case that a transmitted emergency alert message is a message updating the message having a specific referenced_message_id value among the previously transmitted messages, a case that a transmitted emergency alert message is an emergency alert message cancelling the message having a specific referenced_message_id value, a case that a transmitted emergency alert message is a response message in response to a specific request, a case that a transmitted emergency alert message has an error, or a case that a kind of a transmitted emergency alert message is not identified.

FIG. 24 is a diagram of a mobile emergency alert table according to a different embodiment of the present invention.

An emergency alert message should be precisely delivered to a region affected by an event related to an emergency alert. Hence, it is necessary for a broadcasting receiver to review the suitability of a corresponding message before parsing a transmitted emergency alert message.

The mobile emergency alert table according to a different embodiment of the present invention may include a num_

FIPS_codes field, a FIPS_codes field, an EAS_event_code field, a content_coding field, a content_type field, and/or an NRT_service_id filed.

The num_FIPS_codes field indicates the number of FIPS code indicating a region affected by an emergency alert message.

The FIPS_codes field indicates a code indicating a region affected by an emergency alert message. The value of a corresponding field can be expressed by the FIPS code.

The EAS_event_code field indicates a code for an event related to an emergency alert message. A corresponding field can be expressed by 3 characters encoded by UTF-8.

The content_coding field indicates an encoding scheme of an emergency alert message. The content_coding field may be able to indicate a case that the emergency alert message is a plane text or a case that the emergency alert message is compressed by gzip, according to a value of this field.

The content_type field indicates a type of an emergency alert message. The content_type field may be able to indicate a case that the emergency alert message is the emergency alert message used by CMAS or a case that the emergency alert message follows a criterion of a CAP.

The NRT_service_id filed identifies an NRT service including an emergency alert message or additional information on the emergency alert message.

Explanation on the different fields, not having a separate explanation among the fields included in the mobile emergency alert table depicted in FIG. 24, is substituted with the aforementioned explanation on a different embodiment of the present invention.

According to a different embodiment of the present invention, since a broadcasting receiver is able to review whether a transmitted emergency alert message is a message suitable for a region at which the broadcasting receiver is positioned before the message is parsed, only the emergency alert message necessary for a viewer can be delivered to the viewer. And, in case that the emergency alert message is not appropriated for a corresponding region, the broadcasting receiver may be able to reduce unnecessary processing procedure.

FIG. 25 is a diagram of a mobile emergency alert table according to a different embodiment of the present invention.

In order to transmit the content related to an emergency alert message via an NRT service, related information on the NRT service is defined in the SMT in general. Yet, it is necessary to have a method of accessing the NRT service providing the content related to the emergency alert message even in a case that the SMT is not available.

The mobile emergency alert table according to a different embodiment of the present invention may include an NRT_service_IP_address_flag field, and/or an SG_bootstrap_data( ) field/descriptor.

The NRT_service_IP_address_flag field indicates whether there exists IP information related to the NRT service providing additional content for an emergency alert message.

If the NRT_service_IP_address_flag field indicates that the IP information related to the NRT service transmitting additional content for an emergency alert message exists, the SG_bootstrap_data( ) field may be able to define a syntax including the IP information necessary for obtaining the NRT service. The SG_bootstrap_data( ) may be able to include the syntax including the IP information necessary for obtaining the NRT service in a manner of being defined by a descriptor form. It may be able to include a syntax when SG_delivery_network_type defined by ATSC A/153 Part 3 corresponds to '0*02'.

According to a different embodiment of the present invention, it is able to access the NRT service providing additional information on an emergency alert message without using the SMT.

FIG. 26 is a diagram of a descriptor to signal an emergency alert service via an extension of SMT according to one embodiment of the present invention.

A disaster alert service can be transmitted by such an individual service as an A/V service in one ensemble. In this case, it is necessary to perform a signaling for the disaster alert service in the SMT.

A descriptor for signaling an emergency alert service according to one embodiment of the present invention may include a descriptor_tag field, a descriptor_length field, a priority_level field, an EAS_message_sent_type field, an IP_address field, an UDP_port_num field, and/or a service_related_nrt_service_id field.

The descriptor_tag field indicates that a corresponding descriptor is a descriptor for a disaster alert service.

The descriptor_length field indicates a total length of a corresponding descriptor after a corresponding field.

The priority_level field indicates the extent of significance of an emergency alert message. The priority_level field may be able to indicate a case that the emergency alert message is a message to be processed preferentially, a case that the emergency alert message is a message to be processed according to a general process procedure, or a case that a method of a processing the emergency alert message is not defined, according to a value of this field.

The EAS_message_sent_type field indicates a type of transmission of an emergency alert message. The EAS_message_sent_type field may be able to indicate a case that the emergency alert message is transmitted via a separate table, i.e., a mobile emergency alert table, a case that a method of transmitting the emergency alert message is not defined, or a case that the emergency alert message is transmitted via an IP datagram, according to a value of this field.

The IP_address field indicates an IP address of an IP datagram including an emergency alert message, if the EAS_message_sent_type field indicates that the emergency alert message is transmitted via the IP datagram.

The UDP_port_num field indicates a port number of an UDP/IP stream transmitting an IP datagram including an emergency alert message, if the EAS_message_sent_type field indicates that the emergency alert message is transmitted via the IP datagram.

The service_related_nrt_service_id field indicates an ID of an NR service transmitting the content related to an emergency alert message transmitted.

A descriptor according to one embodiment of the present invention can be included in a region for the descriptor included in the SMT. In this case, the SMT can be explained with reference to a type written in ATSC A/153.

FIG. 27 is a diagram of a descriptor to signal an emergency alert service according to a different embodiment of the present invention.

A descriptor for signaling an emergency alert service can be defined in an ensemble level.

The descriptor for signaling the emergency alert service according to a different embodiment of the present invention may include an IP_version_flag field, and/or an ensemble_related_nrt_service_id field. Explanation on the different fields included in the present description is substituted with the explanation on the aforementioned fields of the descriptor.

The IP_version_flag field indicates an IP address type of an IP datagram including an emergency alert message, if the EAS_message_sent_type field indicates that the emergency alert message is transmitted via the IP datagram. The IP_version_flag field may be able to indicate that the IP address type of the IP datagram uses an IPv4 type or an IPv6 address type according to a value of this field.

The ensemble_related_nrt_service_id field indicates an ID of an NRT service transmitting the content related to an emergency alert message transmitted.

According to the present invention, by signaling an emergency alert service in a manner of defining a descriptor in one ensemble, it may be able to avoid a phenomenon that the SMT increases in size.

FIG. 28 is a diagram of a signaling to provide an emergency alert service with one component according to one embodiment of the present invention.

It may be able to transmit an emergency alert service by one component as well as a service or an ensemble level. In this case, a new M/H component descriptor can be defined in a manner of adding a definition of a new component and extracting fields practically used from the FLUTE component data.

The component_type field may be able to indicate that the M/H component is a component for an emergency alert service.

A TSI field of the MH_component_data( ) descriptor can be defined. In this case, the TSI field indicates an identifier for a transport session of FLUTE session, which transmits NRT content.

According to the present invention, in case that an emergency alert service is transmitted by M/H component, since an unnecessary field is not transmitted, it may be able to avoid a phenomenon that data transmission increases for signaling SMT or ensemble level.

FIG. 29 is a diagram of emergency_alert_IP_datagram ( ) descriptor to transmit an emergency alert service according to one embodiment of the present invention.

In order for a receiver to normally analyze the data, which is related to an emergency alert service transmitted via an IP datagram, the corresponding data should have a certain type. Hence, configuring a syntax as shown in FIG. 29 corresponds to one embodiment of the present invention.

An IP_header field indicates an IP header of the IP datagram.

An UDP_header field indicates an UDP header of the IP datagram.

A payload_type_indicator field indicates a payload type of the IP datagram for transmitting an emergency alert message. The payload_type_indicator field may be able to indicate a case that the payload of the IP datagram includes a separate syntax including the information of the emergency alert message, a case that the payload of the IP datagram includes the emergency alert message file itself, or a case that a kind of the payload of the IP datagram is not defined, according to a value of this field.

According to one embodiment, if the payload_type_indicator field indicates that the payload of the IP datagram includes a separate syntax including the information of the emergency alert message, the payload of the IP datagram may be able to include a table of a prescribed form among the aforementioned mobile emergency alert tables.

FIG. 30 is a diagram of emergency_alert_IP_datagram ( ) descriptor to transmit an emergency alert service according to a different embodiment of the present invention.

If the payload_type_indicator field indicates that the payload of the IP datagram includes the emergency alert message file itself, the payload of the IP datagram may be able to include a text and/or a compressed emergency alert message file(s). In this case, the payload includes a series of a message_header and a set of a message_body. The message_header, as shown in FIG. 30, may be able to include detail information on the message_body (a message_body_length, a message_gzipped_flag, and the like).

An emergency_alert_IP_datagram( ) descriptor according to a different embodiment of the present invention may include the message_body_length field and/or the message_gzipped_flag field.

The message_body_length field indicates a length of the message_body. The length of the message_body cannot be greater than the total length of the IP datagram.

The message_gzipped_flag field indicates whether a compressed emergency alert message is included in the message_body. The message_gzipped_flag field may be able to indicate that the emergency alert message included in the payload is compressed by gzip, according to a value of this field.

Explanation on the different fields included in the emergency_alert_IP_datagram( ) descriptor is substituted with the explanation on the aforementioned emergency_alert_IP_datagram( ) descriptor.

FIG. 31 is a diagram of an ESG content fragment for an emergency alert service according to a different embodiment of the present invention.

As mentioned in the foregoing description, content related to an emergency alert message can be transmitted via NRT service. In this case, the content transmitted via the NRT service may be able to deliver detail information via the content fragment of the ESG The ESG content fragment may include an emergency element and/or a weight element.

The emergency element indicates whether a corresponding content is related to an emergency alert situation. For instance, in order to indicate that this content is related to the emergency alert situation, a value of the emergency element can be set to 'true'.

The weight element determines a display order of the contents, which belong to an identical service. For instance, as the value of a corresponding element is lower, a corresponding content can be preferentially displayed in a screen. Hence, in order to preferentially display content in the screen, the value of the weight element should be set low. In case of the content displayed in the screen of a receiver by force, the value of this element can be set to '0'.

The elements not explained in FIG. 31 can be supplemented with reference to the content related to the ESG of ATSC.

According to the present invention, a broadcasting receiver may be able to perform a prompt processing on the content related to an emergency alert message using ESG content fragment.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A method and apparatus according to the present invention may not limitedly apply to the composition and method of the aforementioned embodiments. The aforementioned embodiments may be configured in a manner of being selectively combined the whole of the embodiments or a part of the embodiments to achieve various modifications.

Meanwhile, a method of processing a video can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

MODE FOR INVENTION

As mentioned in the foregoing description, the related is described in the best mode for invention

INDUSTRIAL APPLICABILITY

The present invention can be applied to a whole of a mobile broadcasting industry.

What is claimed is:

1. A device providing an emergency alert service via a mobile broadcasting, comprising:
an RS frame encoder configured to generate an RS frame, which is a 2 dimensional data frame, in a manner of performing an RS (Reed-Solomon)-CRC (Cyclic Redundancy Check) encoding on an ensemble comprising a mobile data for a mobile broadcasting service and a service signaling channel containing access information on the mobile broadcasting service;
an RS frame divider configured to divide the generated RS frame into a plurality of RS frame portions;
a signaling encoder configured to generate a signaling data comprising a TPC (Transmission Parameter Channel) for signaling a transmission parameter of a mobile broadcasting and a FIC (Fast Information Channel) containing a connection information between the ensemble and the mobile broadcasting service;
a data group formatter configured to generate a data group containing a part of the signaling data and the RS frame portion; and
a broadcasting signal generating unit configured to generate a mobile broadcasting signal containing the data group,
wherein the service signaling channel comprises a service map table containing property information on a mobile service transmitted by the ensemble,
wherein the FIC, included in the data group, is transmitted in a form of a plurality of FIC segments,
wherein the FIC segment comprises a FIC segment header and a FIC segment payload, and
wherein the FIC segment header comprises a wake-up identifier field indicating whether a mobile broadcasting receiver performs a wake-up function to automatically turn on a power to provide the emergency alert message.

2. The device providing an emergency alert service via a mobile broadcasting of claim 1,
wherein the service signaling channel further comprises a mobile emergency alert table containing an information for transmitting an emergency alert service via the mobile broadcasting,
wherein the mobile emergency alert table further comprises an NRT service identifier field identifying an NRT service providing an additional information related to the emergency alert message.

3. The device providing an emergency alert service via a mobile broadcasting of claim 2,
wherein the FIC includes a FIC header and a FIC payload,
wherein the FIC header includes an extended header type field specifying whether bytes of a extended FIC header include information for the wake-up function, and an extended version field representing version information of signaling for the wake-up function.

4. The device providing an emergency alert service via a mobile broadcasting of claim 3,
wherein the FIC payload comprises an EAT_ensemble_indicator field indicating whether the mobile emergency alert table is transmitted via the service signaling channel included in the ensemble, an MH_service_signaling_channel_version field indicating a version information of the service signaling channel included in the ensemble, and a num_MH_services field indicating the number of the mobile service transmitted via the ensemble.

5. The device providing an emergency alert service via a mobile broadcasting of claim 2, wherein the mobile emergency alert table further comprises an emergency alert responder type field indicating a reception responder of the emergency alert message.

6. The device providing an emergency alert service via a mobile broadcasting of claim 2, wherein the mobile emergency alert table further comprises an emergency situation type field identifying an emergency situation, which becomes a target of the emergency alert.

7. A method of providing an emergency alert service via a mobile broadcasting, comprising:
generating an RS frame, which is a 2 dimensional data frame, in a manner of performing an RS (Reed-Solomon)-CRC (Cyclic Redundancy Check) encoding on an ensemble comprising a mobile data for a mobile broadcasting service and a service signaling channel containing access information on the mobile broadcasting service;
dividing the generated RS frame into a plurality of RS frame portions;
generating a signaling data comprising a TPC (Transmission Parameter Channel) for signaling a transmission parameter of a mobile broadcasting and a FIC (Fast Information Channel) containing a connection information between the ensemble and the mobile broadcasting service;
generating a data group containing a part of the signaling data and the RS frame portion; and
generate a mobile broadcasting signal containing the data group,
wherein the service signaling channel comprises a service map table containing property information on a mobile service transmitted by the ensemble, wherein the FIC, included in the data group, is transmitted in a form of a plurality of FIC segments, wherein the FIC segment comprises a FIC segment header and a FIC segment payload, and wherein the FIC segment header comprises a wake-up identifier field indicating whether a mobile broadcasting receiver performs a wake-up function to automatically turn on a power to provide the emergency alert message.

8. The method of providing an emergency alert service via a mobile broadcasting of claim 7, wherein the service signaling channel further comprises a mobile emergency alert table containing an information for transmitting an emergency alert service via the mobile broadcasting, wherein the mobile emergency alert table further comprises an NRT service identifier field identifying an NRT service providing an additional information related to the emergency alert message.

9. The method of providing an emergency alert service via a mobile broadcasting of claim 8, wherein the FIC includes a FIC header and a FIC payload, wherein the FIC header includes an extended header type field specifying whether bytes of a extended FIC header include information for the wake-up function, and an extended version field representing version information of signaling for the wake-up function.

10. The method of providing an emergency alert service via a mobile broadcasting of claim 9, wherein the FIC payload comprises an EAT_ensemble_indicator field indicating whether the mobile emergency alert table is transmitted via the service signaling channel included in the ensemble, an MH_service_signaling_channel_version field indicating a version information of the service signaling channel included in the ensemble, and a num_MH_services field indicating the number of the mobile service transmitted via the ensemble.

11. The method of providing an emergency alert service via a mobile broadcasting of claim 8, wherein the mobile emergency alert table further comprises an emergency alert responder type field indicating a reception responder of the emergency alert message.

12. The method of providing an emergency alert service via a mobile broadcasting of claim 8, wherein the mobile emergency alert table further comprises an emergency situation type field identifying an emergency situation, which becomes a target of the emergency alert.

* * * * *